US006993622B2

(12) United States Patent
Khanna et al.

(10) Patent No.: US 6,993,622 B2
(45) Date of Patent: Jan. 31, 2006

(54) BIT LEVEL PROGRAMMING INTERFACE IN A CONTENT ADDRESSABLE MEMORY

(75) Inventors: Sandeep Khanna, Santa Clara, CA (US); Ramagopal R. Madamala, Wichita Falls, TX (US)

(73) Assignee: NetLogic Microsystems, Inc., Mountain View, CA (US)

( * ) Notice: Subject to any disclaimer, the term of this patent is extended or adjusted under 35 U.S.C. 154(b) by 22 days.

(21) Appl. No.: 10/077,829

(22) Filed: Feb. 15, 2002

(65) Prior Publication Data

US 2003/0084236 A1 May 1, 2003

Related U.S. Application Data

(63) Continuation-in-part of application No. 10/000,158, filed on Oct. 31, 2001.

(51) Int. Cl.
*G06F 12/00* (2006.01)

(52) U.S. Cl. ....................... 711/108; 711/128; 711/202; 711/206; 711/209; 711/211; 711/212; 365/49; 370/371; 370/381; 370/382; 370/383; 370/395.31; 370/395.32

(58) Field of Classification Search ................ 711/108, 711/202–203, 211–212, 218, 156–158, 219, 711/128, 206, 209, 217; 370/432, 542, 371, 370/381, 382–383, 395.31, 395.32; 365/49, 365/185.09, 185.29, 189.05
See application file for complete search history.

(56) References Cited

U.S. PATENT DOCUMENTS

| | | | | |
|---|---|---|---|---|
| 3,648,254 A * | 3/1972 | Beausoleil | 365/49 |
| 4,996,666 A | 2/1991 | Duluk, Jr. | |
| 5,046,046 A | 9/1991 | Sweha et al. | |
| 5,088,066 A | 2/1992 | Castro | |
| 5,319,589 A | 6/1994 | Yamagata et al. | |
| 5,438,535 A * | 8/1995 | Lattibeaudiere | 365/49 |
| 5,444,649 A * | 8/1995 | Nemirovsky | 365/49 |
| 5,619,713 A | 4/1997 | Baum et al. | |
| 5,809,330 A | 9/1998 | Ninomiya | |
| 5,890,005 A | 3/1999 | Lindholm | |
| 5,920,886 A | 7/1999 | Feldmeier | |
| 5,956,336 A | 9/1999 | Loschke et al. | |
| 5,978,885 A | 11/1999 | Clark, II | |

(Continued)

OTHER PUBLICATIONS

PCT Search Report, International application No. PCT/US02/28827, International filing date Sep. 10, 2002.

*Primary Examiner*—Donald Sparks
*Assistant Examiner*—Hashem Farrokh
(74) *Attorney, Agent, or Firm*—Shemwell Mahamedi LLP

(57) ABSTRACT

An apparatus and method for generating a comparand in a content addressable memory array. The apparatus includes a content addressable memory (CAM) array and translation circuitry to receive translation information indicative of translation of a bit group from an initial position in input data to a different position in a comparand transmitted to the CAM array. The translation circuitry includes a switch circuit, one or more storage elements to store the translation information, and one or more decode circuitry to decode the translation information and establish switch circuit connections between the initial position and the position in the comparand. The apparatus also includes program circuitry to provide a bit level programming interface with the translation circuitry. The apparatus may also include a programming bit register to store programming information in the form of a binary pattern where each bit represents a bit group of the input data.

36 Claims, 20 Drawing Sheets

U.S. PATENT DOCUMENTS

| | | | | |
|---|---|---|---|---|
| 6,041,389 | A | 3/2000 | Rao | |
| 6,069,573 | A | 5/2000 | Clark, II et al. | |
| 6,081,440 | A | 6/2000 | Washburn et al. | |
| 6,169,685 | B1 | 1/2001 | Gandini et al. | |
| 6,243,281 | B1 * | 6/2001 | Pereira | 365/49 |
| 6,275,406 | B1 | 8/2001 | Gibson et al. | |
| 6,289,414 | B1 | 9/2001 | Feldmeier | |
| 6,324,087 | B1 | 11/2001 | Pereira | |
| 6,351,142 | B1 * | 2/2002 | Abbott | 326/39 |
| 6,353,873 | B1 | 3/2002 | Melchior | |
| 6,373,758 | B1 | 4/2002 | Hughes et al. | |
| 6,374,326 | B1 | 4/2002 | Kansal et al. | |
| 6,424,659 | B2 * | 7/2002 | Viswanadham et al. | 370/469 |
| 6,445,628 | B1 | 9/2002 | Pereira et al. | |
| 6,525,987 | B2 | 2/2003 | Hilbert | |
| 6,597,595 | B1 | 7/2003 | Ichiriu et al. | |
| 6,629,099 | B2 | 9/2003 | Cheng | |
| 6,658,002 | B1 * | 12/2003 | Ross et al. | 370/392 |
| 6,691,252 | B2 | 2/2004 | Hughes et al. | |
| 2002/0007446 | A1 | 1/2002 | Stark | |
| 2002/0015348 | A1 * | 2/2002 | Gillingham et al. | 365/227 |
| 2002/0073073 | A1 * | 6/2002 | Cheng | 707/2 |
| 2002/0126672 | A1 | 9/2002 | Chow et al. | |
| 2003/0005146 | A1 * | 1/2003 | Miller et al. | 709/238 |
| 2003/0039135 | A1 | 2/2003 | Srinivasan et al. | |
| 2003/0131331 | A1 | 7/2003 | Reblewski et al. | |
| 2004/0032775 | A1 | 2/2004 | Srinivasan | |

* cited by examiner

BIT LEVEL PROGRAMMING INTERFACE IN A CONTENT ADDRESSABLE MEMORY

REFERENCE TO RELATED APPLICATION

This application is a continuation-in-part of U.S. application Ser. No. 10/000,158, filed Oct. 31, 2001.

FIELD OF THE INVENTION

This invention relates to the field of memory devices and, in particular, to content addressable memory devices.

BACKGROUND OF THE INVENTION

Networks contain a collection of computing systems (e.g., clients and servers) that are interconnected by transmission lines to enable the transfer of data between them. A network typically includes multiple access points (e.g., routers and servers) that may switch and/or route data between transmission lines to transfer data from a source to a destination. Data is typically transmitted in the form of packets that are made up of smaller data cells. A packet is a unit of data that is routed between a source and a destination on a packet-switched network. When a file (e.g., e-mail, graphics, etc.) is sent from one place to another on a network, the file is divided into such smaller packets making them more efficient for transmission. The individual packets for a given file may travel different routes throughout networks with each packet containing both data and transmission information associated with the routing of data. As such, a packet may be described as having a payload containing the data, and one or more headers that contain the routing information (e.g., a destination address).

When all the packets have arrived at a destination, they are reassembled into the original file at the receiving end. Such a packet switching scheme is an efficient way to handle transmission on a connectionless network. This is in contrast to a circuit switching scheme where a connection (e.g., a voice connection) requires the dedication of a particular path for the duration of the connection.

A router is a device (e.g., hardware, firmware, software) that determines the next network segment to which a packet should be forwarded towards its destination. A router may be positioned at points within a network or where one network meets another, referred to as a gateway. A router may create and maintain tables of the available routes and their conditions for use with other information to determine the best route for a given packet. Typically, a packet may travel through a number of network points having routers before arriving at its destination.

When a data packet arrives at the input of a router, several lookups may be performed to determine the subsequent handling of the packet, as illustrated in FIG. 1. The lookups may include, for examples, where to send the packet next (Next Hop), the quality of service requirement (QoS), the Ethernet port address, etc. Consider, for example, a packet arriving at Router-A. Router-A needs to determine whether the packet is destined for local servers connected directly to Router-A, or if the packet should go to the next router on a route (Router-B) to a destination. Additionally, Router-A may assign a priority based on the destination address (DA) and the source address (SA) of the packet.

The packet header may first be parsed or processed to get the values from different fields (e.g., SA, DA, protocol type, QoS, etc) in order to perform the various lookups. A packet classification lookup, for example, may be performed using SA, DA and other relevant fields in the packet header. The Next Hop lookup, for example, may also be performed to determine whether the packet is meant for local servers or for Router-B. If the packet is destined for Router-B, the packet is then put in a queue for Router-B. If the packet is destined for a local server (e.g., Server-1 or Server-2), then a media access control (MAC) lookup is performed to send the packet to the appropriate server. In the preceding example, three lookups are necessary for sending the packet on its way: Packet Classification, Next Hop, and MAC. However, often there are other lookups performed on the packet header, with the number of lookups exceeding five or more.

Routers may use processors and content addressable memory (CAM) devices to perform the various lookups on packets. As opposed to a random access memory (RAM) device, in which information is accessed by specifying a particular memory location address, the data stored in a CAM is accessed by the contents of the data. More specifically, instead of using an address to access a particular memory location, a CAM uses a key that contains a portion of the desired contents of a particular memory cell in the memory device. The CAM can be instructed by a processor to compare the key, also referred to as comparand data (e.g., packet header data) with data stored in its associative memory array, as illustrated in FIG. 2. The CAM simultaneously examines all of its entries and selects the stored data that matches the key.

When the entire CAM device, or blocks thereof, is searched simultaneously for a match of the stored data with the key comparand data, the CAM device indicates the existence of a match by asserting a match flag. Multiple matches may also be indicated by asserting a multiple match flag. The CAM device typically includes a priority encoder to translate the matched location into a match address or CAM index. The priority encoder may also sort out which matching memory location has the top priority if there is more than one matching entry.

Data may be represented in the form of strings of binary digits ("bits") having a low ("0") logic state and a high ("1") logic state. Different types of CAMs may be used with different data formats. A binary CAM is designed to operate with "0" and "1" states, while a ternary CAM is designed to operate with "0", "1", and "don't care" states. The bits may be organized into groups such as a word (e.g., 64 or 72 bits wide) and stored in different segments of a CAM. The keys used for different data fields may have different word sizes, for example, the key for a Classification lookup may be 128 bits wide and the key for a Next Hop lookup may be 32 bits wide.

A router may include multiple CAMs, with each CAM having a different table or, alternatively, a single CAM having multiple blocks for each of the different tables, for performing the different lookups. For example, a router may include a 32 bit wide Next Hop CAM, a 128 bit Classification CAM, and a 48 bit MAC CAM. With routers having multiple CAMs, each of the multiple CAMs are typically connected to common buses that are used to communicate the various keys and other input and output data with each of the CAM devices. Similarly, with routers having a single CAM with multiple blocks, each of the blocks is accessed using common buses. Thus, lookups are typically performed sequentially before a packet is processed (e.g., routed to the next destination or classified). Because the buses are shared with so many input and output functions of all the CAMs or CAM blocks, many clock cycles are required to multiplex data on the bus. This generally limits the search rate and overall throughput of conventional CAM devices. As the number of ports, segments, or devices that are supported by routers and as the number of lookups increase, conventional CAM devices and architectures can undesirably limit the system's overall throughput.

BRIEF DESCRIPTION OF THE DRAWINGS

The present invention is illustrated by way of example and not intended to be limited by the figures of the accompanying drawings.

DETAILED DESCRIPTION

Figure 1:
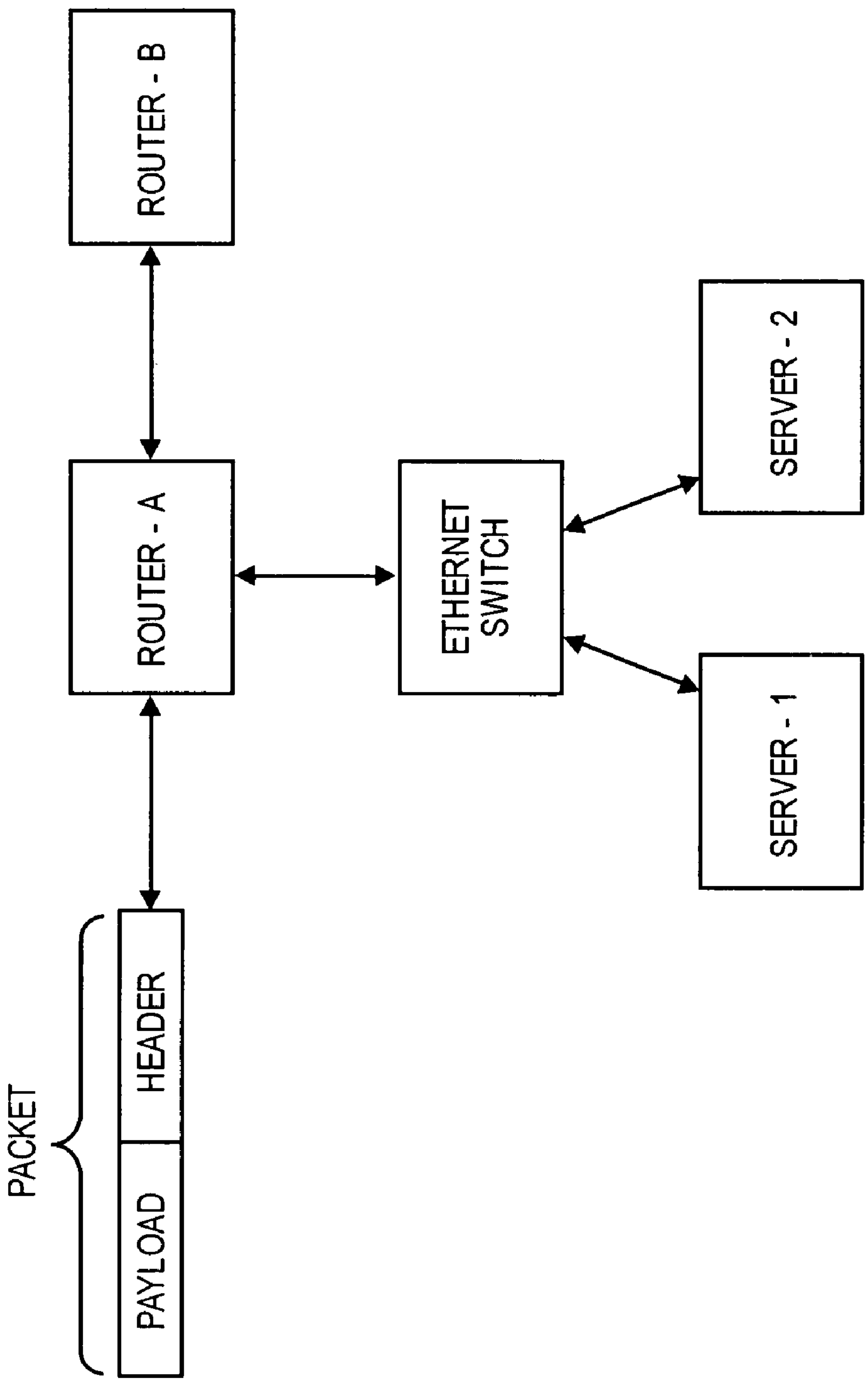
FIG. 1 is a conceptual illustration of packet handling by a router.
Figure 2:
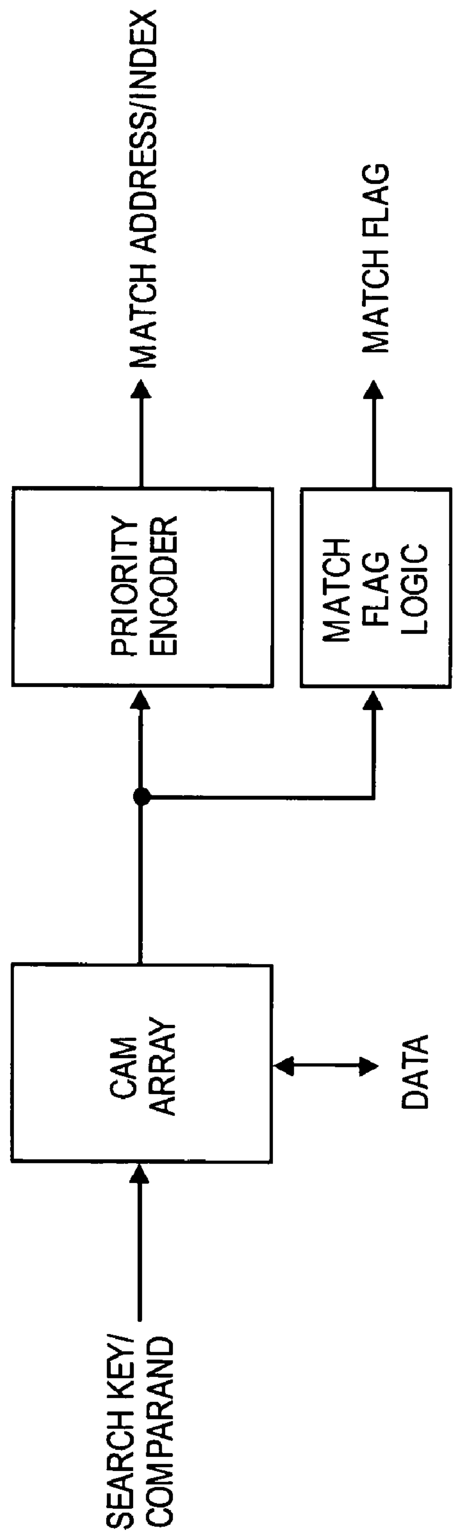
FIG. 2 illustrates one embodiment of a CAM device.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Embodiments of the present invention include various method steps, which will be described below. The steps may be performed by hardware components or may be embodied in machine-executable instructions, which may be used to cause hardware components (e.g., a processor, programming circuit) programmed with the instructions to perform the steps. Alternatively, the steps may be performed by a combination of hardware and software.

Embodiments of the present invention may be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

In one embodiment, the methods and apparatus described herein may be used to translate a input data (e.g., an input string) to multiple comparands for concurrent searching in a content addressable memory. In one embodiment, two or more comparands of differing widths may be generated concurrently from a common input string using multiple translation circuitry.

Each translation circuitry includes storage elements, for example, program registers that may be programmed with the translation information that determines the manner in which bytes from the input string are translated into the comparand. The translation information stored in the program registers may be decoded by decode circuitry. The decoded information is used to control the operation of a switch to select one or more particular bits or bit groups of the input string for generation of a comparand designated by the decoded information. The resultant comparand string may be contiguous, or may have gaps, or may have repeated bits or groups of bits. The resulting comparand may be used to perform a look-up in an associated CAM array or smaller section thereof (e.g., a block or a block segment). In one embodiment, the comparand may be loaded into positions of a comparand register designated by the decoded information and stored before a look-up in an associated CAM array is performed.

It should be noted that while at times reference may be made to "bytes," such reference is only exemplary for ease of discussion and, unless otherwise stated, is not meant to limit the invention. As such, the methods and apparatus discussed herein may be implemented with one or more bits or bit groups (with each bit group containing one or more bits). In addition, the steps and operations discussed herein (e.g., the loading of registers) may be performed either synchronously or asynchronously. The term "coupled" as used herein means connected directly to or connected through one or more intervening components or circuits.

In one embodiment where the width of the input data is larger than the width of the input bus on which the input data is applied to the CAM device, the translation circuitry may receive segments of the input data over multiple operation cycles. In such an embodiment, the translation circuitry may include multiple program registers with each program register storing translation information for each segment of the input string received in the different cycles. By decoding common input data to generate multiple comparands in parallel, rather than sequentially, concurrent lookups on separate CAMs (e.g., arrays, blocks, block segments) may be performed and packet throughput in a CAM device may be significantly increased.

Figure 3A:
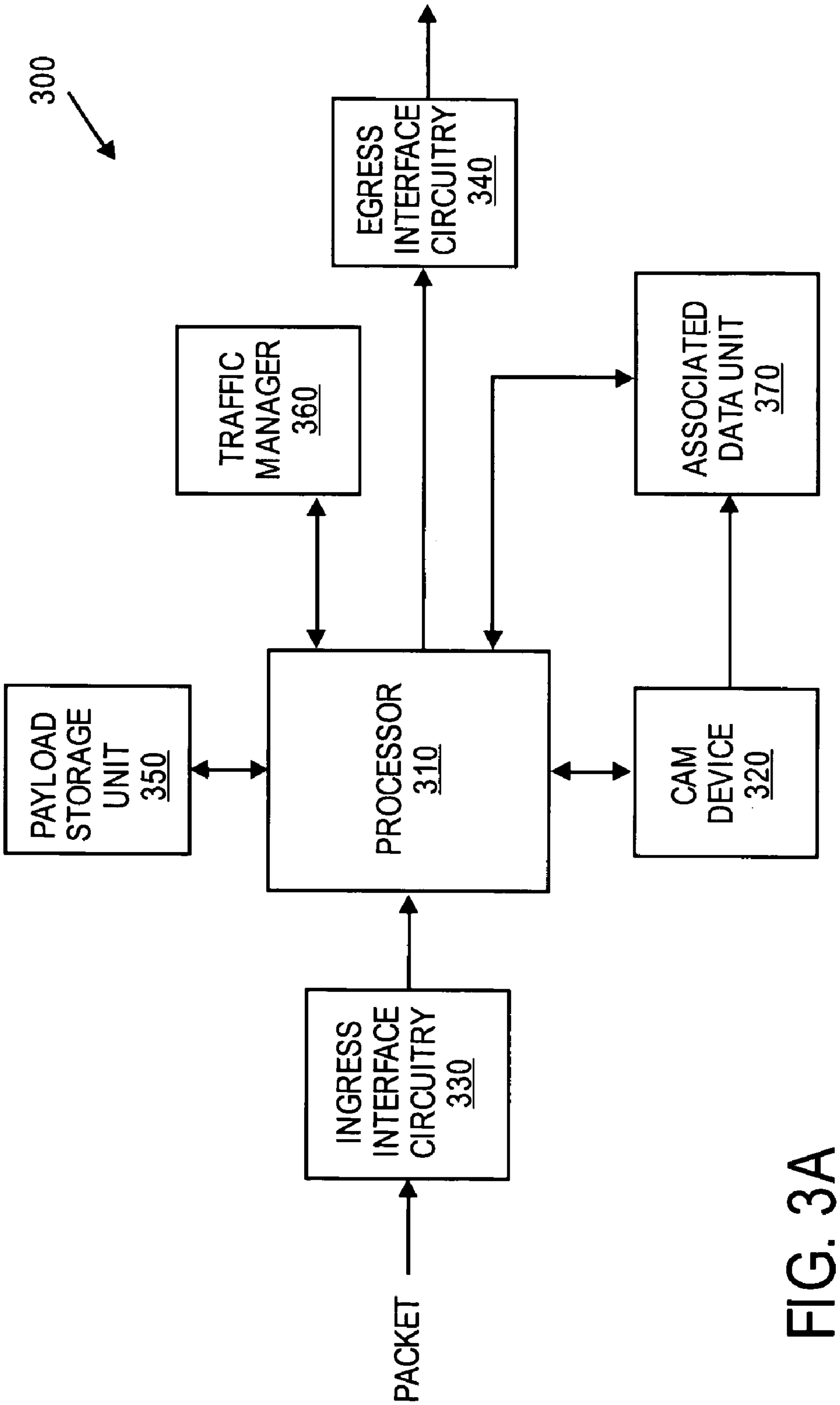
FIG. 3A illustrates one embodiment of a line card or blade of a router having a CAM device configured to decode of an input string according to the present invention.

FIG. 3A illustrates one embodiment of a line card or blade of a router having a CAM device configured to perform concurrent lookups. Line card 300 includes processor 310, ingress interface circuitry 330, egress interface circuitry 340, CAM device 320, associated data storage unit 370, traffic manager 360, and payload storage unit 350.

Processor 310 functions to control the overall operation of line card 300 in cooperation with the other components of line card 300. For example, processor 310 receives packets from a network medium through ingress interface circuitry 330, stores the payload of packets in payload storage unit 350, and processes packet header information to determine required lookups in CAM device 320 and subsequent handling of the packets, as discussed herein. Ingress circuitry includes, for example, PHY and MAC devices. Processor 310 sends out packets on a network medium through egress interface circuitry 340 based on the lookups performed by CAM device 320. Egress interface circuitry 340 may be connected to a switch fabric or directly to one or more other routers or switches. Processor 310 may be one or more network processor units (NPUs), microprocessors, or one or more special purpose processors such as a digital signal processor (DSP). In another embodiment, processor 310 may be another type of controller, for example, a field programmable gate array or a general purpose processor. The processor 310, ingress interface circuitry 330, and egress interface circuitry 340 components of a router are known in the art; accordingly, a detailed discussion is not provided.

In response to information in a packet header, for a particular packet, processor 310 determines the number and types of lookups to be performed by one or more of CAM devices 320, and forms the search keys for these lookups. The searches or lookups may include, for example, Classification lookups, forwarding lookups (e.g., Next Hop or longest prefix match (LPM) lookup, MAC lookup, MPLS lookup, etc.). When multiple searches are required, processor 310 forms a composite search key that includes at least two, and as many as all, of the various search keys for the lookups. The composite search key is provided as a common input string to CAM device 320. CAM device 320 selectively identifies and extracts the individual search keys from the common input string and provides the individual search keys to an associated CAM array or block to perform a lookup. A block may be an entire array, sub-array, or a portion of an array or sub-array. Where CAM device 320 includes multiple arrays, blocks, or block segments, as discussed below, different lookups can then occur concurrently or simultaneously in CAM device 320, thereby increasing overall throughput over conventional systems in which searches are processed sequentially.

CAM device 320 includes translation circuitry to generate search keys from the common input string that are provided to the associated CAM array to perform the lookups, as discussed below. After one or more lookups are executed in CAM device 320, associated information for matching entries (e.g., additional routing information and/or packet information) may be retrieved from associated data unit 370. Processor 310 then communicates with traffic manager 360 to schedule the exit of a packet from line card 300 via egress interface circuitry 340.

Figure 3B:
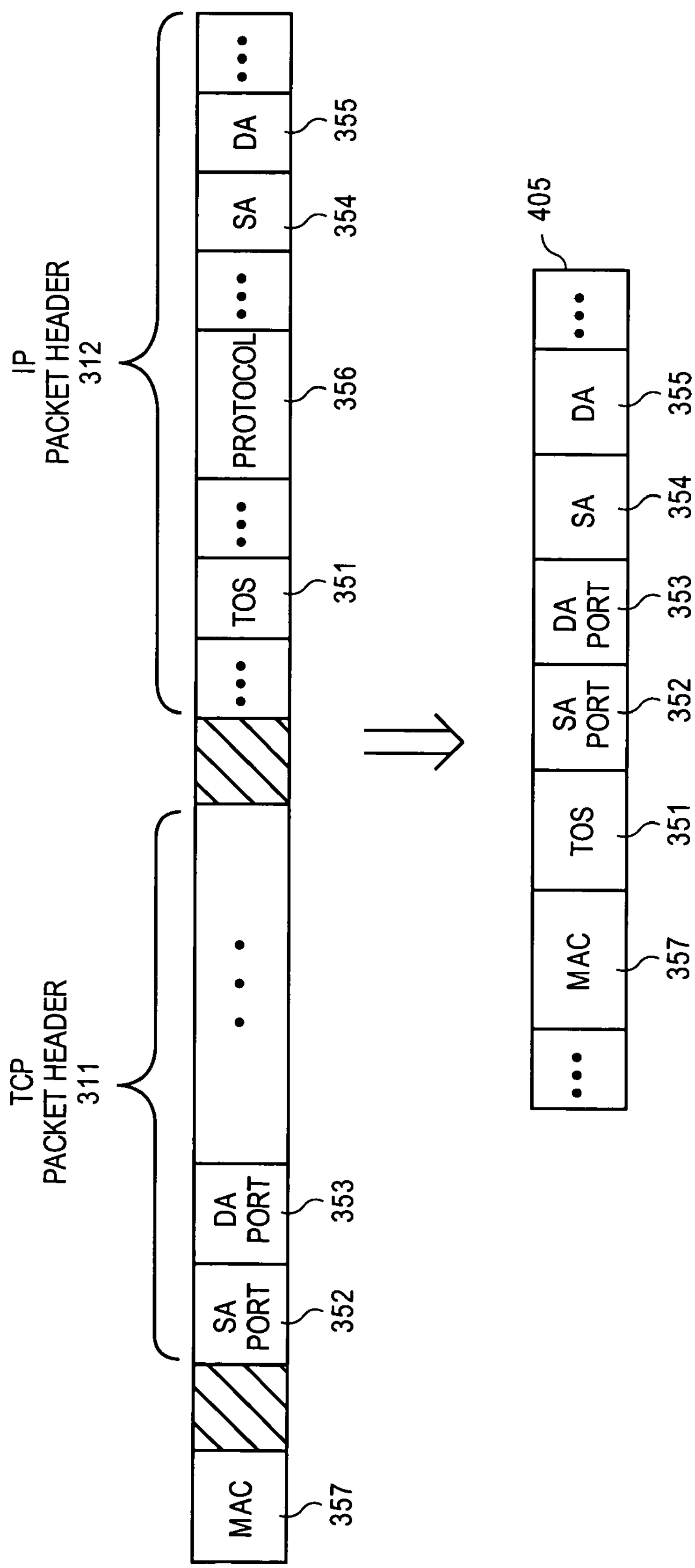
FIG. 3B illustrates one embodiment of input data in the form of an input string.

FIG. 3B illustrates one embodiment of input data in the form of an input string. In one embodiment, input string 405 may include field segments parsed or processed from one or more packet headers 311 and 312. When data processing systems (e.g., routers, clients, servers) exchange data over a network, the procedure involves the use of protocols by which these systems agree on how to communicate with each other. To reduce design complexity, networks may be organized as a series of layers. The number of layers and the function of each layer varies from network to network.

For example, where a transmission control protocol (TCP)/Internet protocol (IP) is used, it is organized into multiple layers including a network access layer and an Internet layer. The network access layer uses a TCP to enable the exchange of data between an end system and a network. An Internet layer uses an IP to enable data to transverse multiple interconnected networks. Each of these protocols use packet headers containing routing information, as discussed above. For example, TCP packet header 311 includes a source address (SA) port segment 352 and a destination address (DA) port segment 353, and IP packet header 312 includes a SA segment 354, a DA segment 355, a type of service (ToS) segment 351, and a protocol type segment 356.

In one embodiment, for example, processor 310 of FIG. 3A may be used to parse certain segments from packet headers 311 and 312 to generate input string 405 and transmit the input string to CAM device 320. For example, input string 405 may include MAC segment 357, TOS segment 351, SA port segment 351, DA port segment 352, SA segment 354, and DA segment 355. Alternatively, input string 405 may include more or less than the segments illustrated. One or more bits or group of bits (e.g., bytes) of different field segments of input string 405 may be translated to generate different comparand strings to concurrently perform different lookups in the CAM blocks, as discussed below. In an alternative embodiment, processor 310 may transmit as-received unparsed header segments to CAM device 320.

Figure 3C:
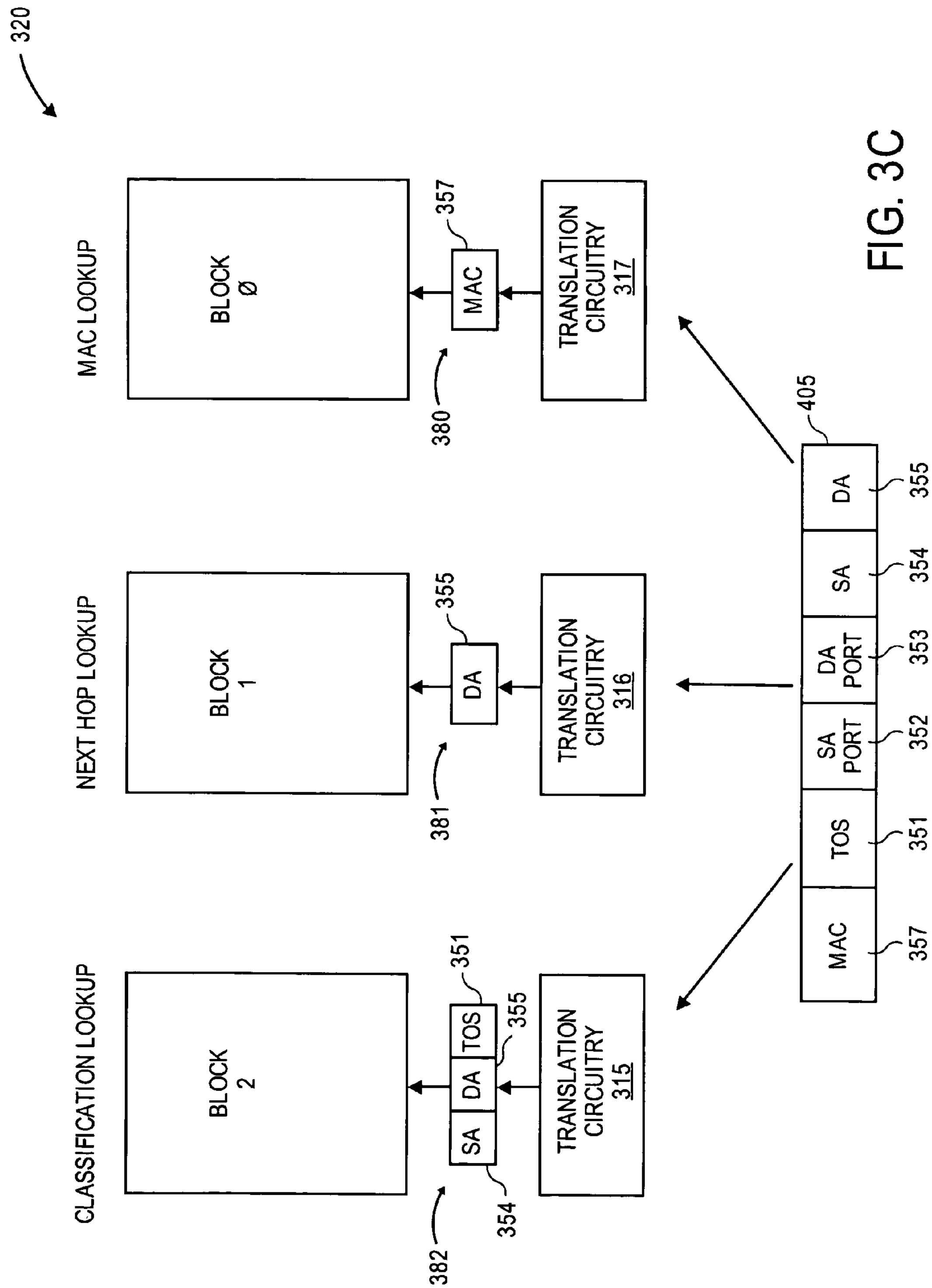
FIG. 3C illustrates a CAM device having multiple blocks or arrays of CAM cells that are coupled to corresponding translation circuitry.

FIG. 3C illustrates a CAM device having multiple blocks or arrays of CAM cells coupled to a corresponding translation circuitry. For example, CAM device 320 may include multiple CAM blocks 0, 1, and 2 with each block coupled to a corresponding translation circuitry 315, 316, and 317, respectively. Each of the translation circuitry 315–317 is configured to receive and process input string 405.

In one embodiment, translation circuitry 315–317 may be preprogrammed to translate particular segments of the input string 405 in order to perform concurrent lookups on the various tables stored in blocks 0–2. For example: translation circuitry 317 may be preprogrammed to translate one or more bits or group of bits of MAC segment 357 to the comparand string 380; translation circuitry 316 may be pre-programmed to translate one or more bits or group of bits of DA segment 355 to the comparand string 381; and translation circuitry 315 may be pre-programmed to translate one or more bits or group of bits of SA segment 354, DA field segment 355 and TOS segment 351 to the comparand string 382. By translating one or more bits or group of bits of the different field segments from a common input string 405, in parallel, each of comparand strings 380–381 may then be used to perform the various lookups in the CAM blocks. For example: comparand string 380 may be used to perform a MAC lookup in CAM block 0; comparand string 381 may be used to perform a Next Hop (e.g., LPM) lookup in CAM block 1; and comparand string 382 may be used to perform a Classification lookup in CAM block 2.

In one embodiment, the lookups may all be performed concurrently. This may improve packet throughput in a router over routers utilizing prior CAM architectures. For example, if each lookup individually requires n clock cycles to perform, only a total of n clock cycles may be required to perform all three lookups, rather than 3n clock cycles, because the lookups are performed concurrently. Alternatively, one or more of the lookups may be performed sequentially. In yet another embodiment, some, but not all, of the lookups may be performed concurrently.

Figure 4A:
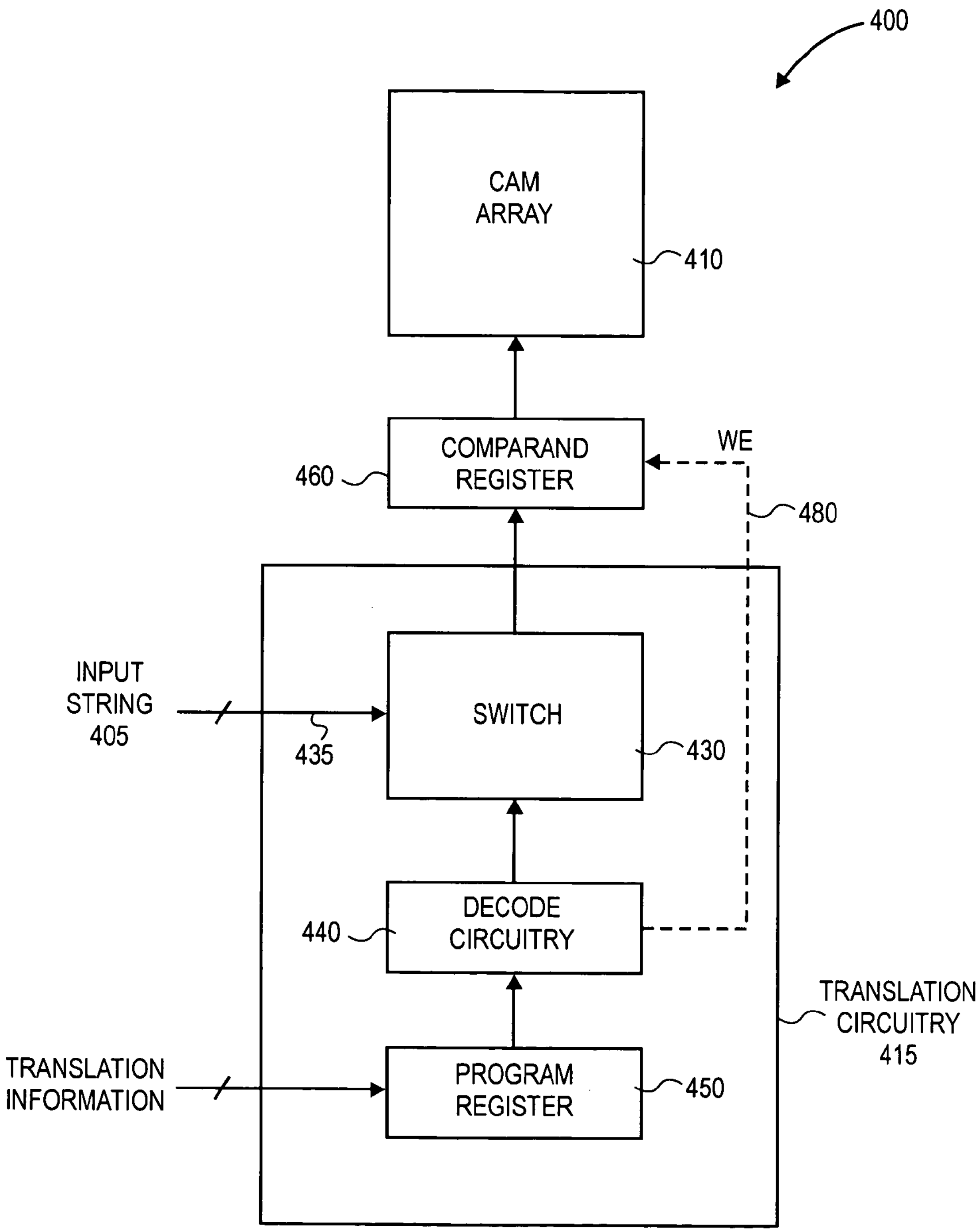
FIG. 4A illustrates one embodiment of a CAM device having translation circuitry.

FIG. 4A illustrates one embodiment of a CAM device having translation circuitry. In one embodiment, CAM device 400 includes a CAM array 410, a comparand register 460, and translation circuitry 415. CAM device 400 may be CAM device 320 of FIG. 3A. CAM array 410 (and the other CAM arrays discussed herein) includes CAM cells that may be of any type of CAM cells including binary or ternary NAND and NOR based cells that may be formed from either volatile or non-volatile elements.

In one embodiment, translation circuitry 415 includes input bus 435, switch 430, decode circuitry 440, and program register (PR) 450. Program register 450 may be pre-programmed with translation information that determines how one or more bits or group of bits of input data (e.g., input string 405) are translated to a comparand. Alternatively, storage elements other than a register may be used to store the programmed translation information including volatile and non-volatile elements. The resultant comparand string may be used to perform a lookup in CAM array 410. Alternatively, in one embodiment, the translated one or more bits or group of bits of input string 405 may be stored in a comparand storage element, for example, comparand register 460. One or more global masking circuits (not shown) may be coupled between comparand register 460 and CAM array 410 to enable global masking as discussed below.

Figure 4B:
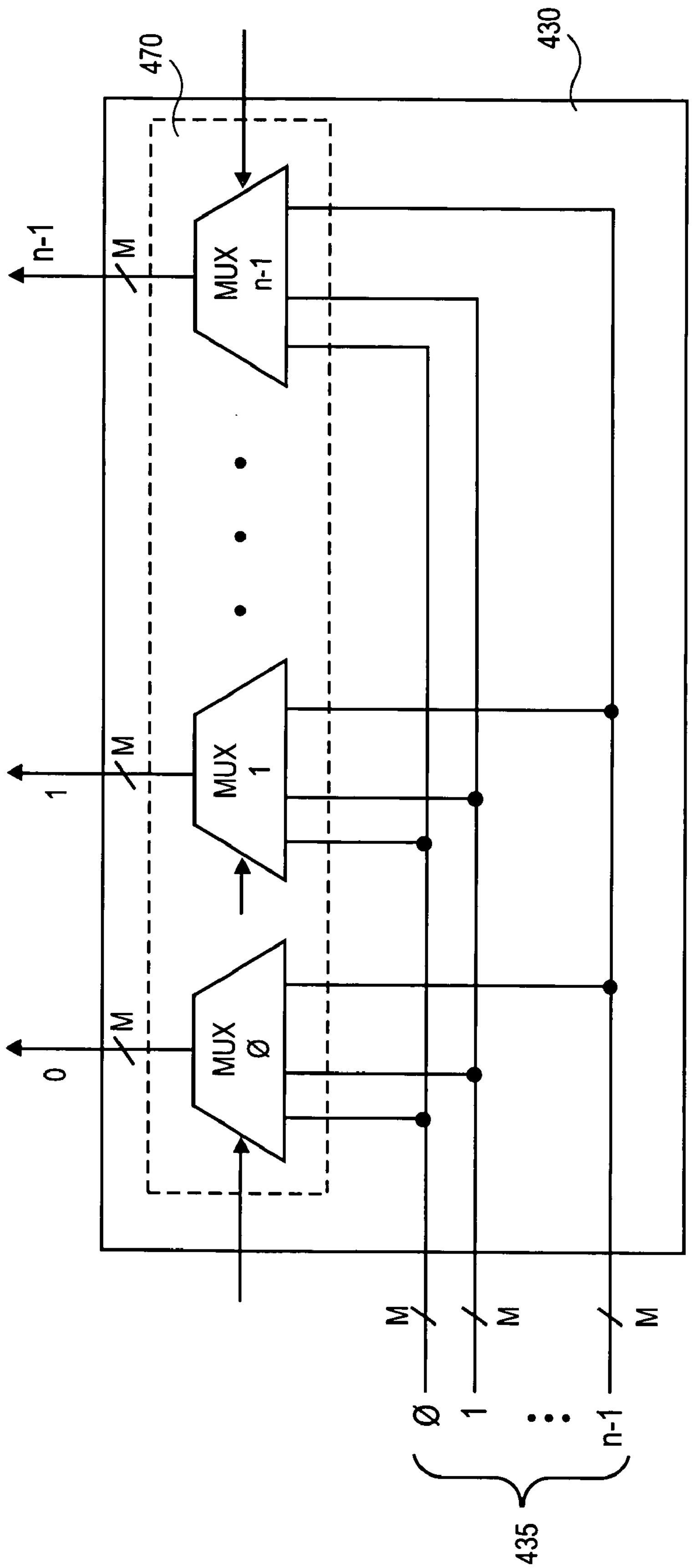
FIG. 4B illustrates one embodiment of a switch that may be used in a CAM device.

Program register 450 is coupled to decode circuitry 440. Decode circuitry 440 decodes the information stored in program register 450. The decode circuitry 440 is coupled (e.g., connected directly to or through one or more intervening circuits) to switch 430. Decode circuitry 440 generates control signals for programming switch 430 based on the information stored in the program register 450. The switch 430 is coupled to receive input string 405 via the signal lines of bus 435. Switch 430 represents a matrix of intersections between the signal lines of input bus 435 and positions of comparand register 460. In one embodiment, switch 430 includes n number of multiplexers 470 each coupled to receive as inputs a group of m signal lines of bus 435, as illustrated in FIG. 4B. In one embodiment, there may be n groups of m signal lines. Although, "m" may be used, hereafter, to indicate a byte, or 8 bits, any other number of bits may be used. Moreover, each group may have the same or a different number of signal lines.

It should be noted that although decode circuitry 440 is illustrated separately from switch 430, the operations of decode circuitry 440 may be incorporated into switch 430 or performed by a separate circuit. Similarly the operations of other illustrated components of the figures may be performed by separate circuits or incorporated within other circuits.

In one embodiment, switch 430 may be a cross-bar switch that operates on a per bit group (e.g., per byte) basis. For example, switch 430 may be configured to select particular bytes of input string 405 transmitted on signal lines 435 and load them into certain byte positions of comparand register 460. The bytes on signal lines 435 are selected using multiplexers 470 under the control of decode circuitry 440 and correspondingly output to a particular byte position of comparand register 460. In this manner, one or more bytes of input string 405 may be re-arranged to have a different byte position in a comparand string stored in comparand register 460 than its position in input string 405. In one embodiment, switch 430 may be programmed during normal operations of the CAM device 400, for example, by processor 310 in line card 300 of FIG. 3A. Alternatively, switch 430 may be pre-programmed prior to normal operations of the CAM device 400. Registers and multiplexers are known in the art; accordingly a detailed discussion is not provided.

In one embodiment, decode circuitry 440 may also be configured to output one or more write enable (WE) signals 480 to comparand register 460. The write enable signals operate to control when comparand register 460 (or a segment thereof) loads the output of switch 430. For one embodiment, a separate write enable signal may be generated for each segment of comparand register 460 associated with the decoded output of switch 430. Alternatively, the write enable signals may be generated through other means, for example, by processor 310 of FIG. 3A. In yet another embodiment, the write enable signals may be generated in response to CAM device 400 receiving a write instruction or control signal, for example, from an instruction decoder or other control circuitry that receives and processes instructions or control information from another device such as processor 310 of FIG. 3A.

Figure 5A:
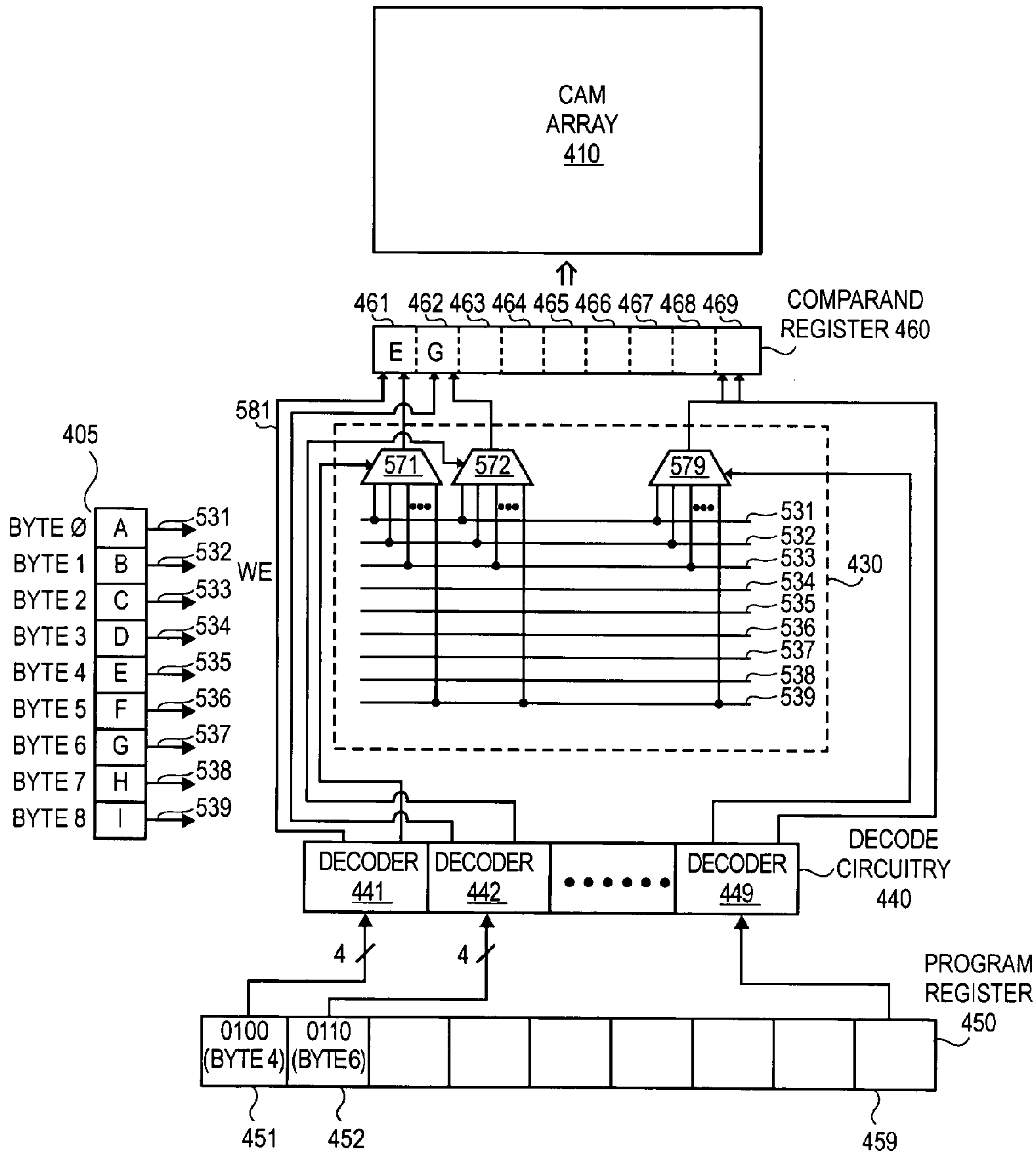
FIG. 5A illustrates an exemplary embodiment of a CAM device.

FIG. 5A illustrates an exemplary embodiment of CAM device 400 showing non-exhaustive exemplary embodiments of switch 430, decode circuitry 440, and program register 450. In the illustrated embodiment of FIG. 5A, switch 430 receives nine groups of signals from signal lines 531–539 of input bus 405. Each group is coupled to each of the nine multiplexers 571–579. Alternatively, switch 430 may include more or less than nine signal lines and nine multiplexers.

In the illustrated exemplary embodiment, decode circuitry 440 includes a corresponding number of decoders 441–449 with the outputs of each decoder coupled to a corresponding one of multiplexers 571–579. For example, the outputs of decoder 441 are coupled to control or select inputs of multiplexer 571 and the outputs of decoder 449 are coupled to control or select inputs of multiplexer 579. Decode circuitry 440 is configured to receive translation information from PR 450 and decode the received translation information in order to control the operation of switch 430.

Each decoder (e.g., decoders 441–449) of decode circuitry 440 is coupled to receive translation information (e.g., one or more bits) from a corresponding register position of PR 450 (e.g., register positions 451–459). PR 450 stores the translation information that is decoded by decode circuitry 440 to program switch 430. Decoders are known in the art; accordingly a detailed discussion is not provided herein.

In one embodiment, for example, PR 450 is a nine position register storing information that correlates to a particular byte of input string 405. The information may be stored, for example, in binary format. With such a format, only four bits are needed in each position to reference a particular byte of the nine bytes of input string 405. For example, a 0100 bit pattern may be programmed in register position 451 to designate byte 4 of input string 405, and a 0110 bit pattern may be programmed in register position 452 to designate byte 6 of input string 405. Continuing the example, decoder 441 decodes the bit pattern stored in register position 451 and, as a result, outputs control signals to multiplexer 571 to select the byte 4 data ("E") on input signal lines 535 for output to register position 461 of comparand register 460. Decoder 442 decodes the bit pattern stored in register position 452 of PR 450 and, as a result, outputs control signals to multiplexer 572 to select byte 6 data ("G") on input signal lines 537 for output to register position 462 of comparand register 460. Each of decoders 443–449 may output control signals to multiplexers 573–579, respectively, to select a byte on a particular byte line 531–539 (for output to corresponding comparand register positions 464–469) based on data stored in PR positions 453–459, respectively.

As such, PR 450 may be programmed to determine the manner in which the bytes of input string 405 are loaded into comparand register 460 using switch 430. The comparand string is then used to perform a look-up in CAM array 410.

In one embodiment, each of the decoders of decode circuitry 440 may also be configured to output a write enable (WE) signal on a write enable line. The write enable lines may be coupled to comparand register 460, for example, decoder 441 may output a WE signal on line 581 coupled to byte position 461 of comparand register 460. The write enable signal operates to control when comparand register 460 (or segment thereof) loads the output of a corresponding multiplexer. Comparand register 460 may then output its contents to CAM array 410 in order to perform a look-up. Alternatively, the write enable signal may be generated through other means, for example, with processor 310 of FIG. 3A. Alternatively, the write enable signals may be generated by a control circuit such as an instruction decoder, for example, in response to a write or write and compare instruction that causes comparand register 460 to be selectively loaded by the translation circuitry with data from input bus 435. Decode circuitry 440 may also be configured to receive one or more clock signal(s) from a clock generator (not shown) to control the operation of the decode circuitry. As previously mentioned, the decoders 441–449 may be part of multiplexers 571–579 with the information stored in PR 450 provided directly as select signals to multiplexers 571–579.

For another embodiment, a single write enable signal may be provided to more than one segment of comparand register 460.

It should be noted again that in alternative embodiments the methods and apparatus discussed herein may also be implemented on a bit basis, rather than a byte basis, where density requirements for the CAM device are not too stringent. For example, input bus 435 may have n signal lines with each signal line couple to receive a bit of input string 405. A corresponding number of multiplexers may be used to select from among the bits of the input string based on the decoding of bit data programmed in program register 450.

For another alternative embodiment, one or more of multiplexers 571–579 does not have inputs to receive all of the groups of signal lines 531–539. For one example, multiplexer 571 has inputs coupled to receive all of the groups of signal lines 531–539, multiplexer 572 has inputs coupled to receive groups of signal lines 532–539, and so on. For this example, multiplexer 579 may not be needed at all, and comparand register position 469 may be directly connected to group signal lines 539. Other schemes may also be used.

Figure 5B:
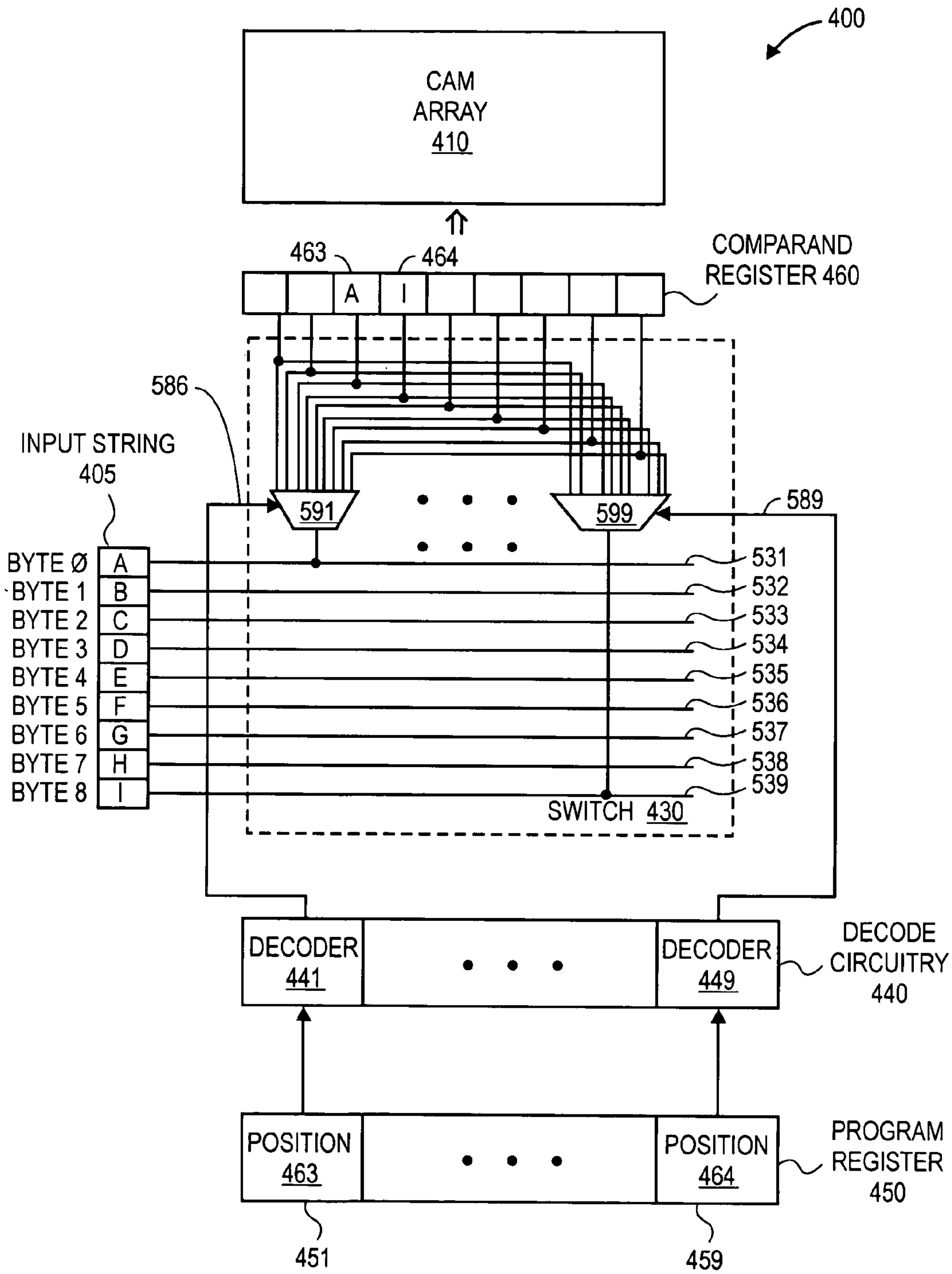
FIG. 5B illustrates an alternative exemplary embodiment of a CAM device.

FIG. 5B illustrates another embodiment of CAM device 400 showing alternative embodiments of switch 430, decode circuitry 440, and program register 450. In one embodiment, program register 450 may store the position of the comparand register 460 to which an input byte of input string 405 will be loaded into. In such an embodiment, switch 430 includes demultiplexers 591–599. Each group of signal lines 531–539 is coupled to only one of demultiplexers 591–599, respectively. Each of demultiplexers 591–599 is coupled to all of the positions of comparand register 460.

The decoders of decode circuitry 440 are coupled to a corresponding one of demultiplexers 591–599. For example, the outputs of decoder 441 are coupled to control or select inputs 586 of demultiplexer 591 and the outputs of decoder 449 are coupled to control or select inputs 589 of demultiplexer 599. Decode circuitry 440 is configured to receive translation information from PR 450 and decode the received information in order to control the operation of switch 430. In the embodiment illustrated in FIG. 5B, PR 450 stores information that correlates to a particular position of comparand register 460. For example, translation information may be programmed in register position 451 to designate position 463 of comparand register 460 and translation information may be programmed in register position 459 to designate register position 464 of comparand register 460. In this manner, decoder 441 decodes the translation information stored in register position 451 and controls demultiplexer 591 to output the bits (e.g., "A") of byte 0 of input string 405 to register position 463 of comparand register 460. Similarly, decoder 449 decodes the translation information stored in program register position 459 and controls demultiplexer 599 to output the bits (e.g., "I") of byte 8 of input string 405 to register position 464 of comparand register 460.

As discussed above with respect to FIG. 5A, each of the decoders may also be configured to output a write enable (WE) signal to comparand register 460 to control when comparand register 460 (or segment thereof) loads the output of a corresponding demultiplexer 591–599.

Additionally, the decoders 441–449 may be part of demultiplexers 591–599 with the translation information stored in PR 450 provided directly as select signals to demultiplexers 591–599.

For another alternative embodiment, one or more of demultiplexers 591–599 does not have outputs coupled to each of the comparand register positions. For one example, demultiplexer 591 has outputs coupled to all of the comparand register positions, demultiplexer 592 has outputs coupled to all of the comparand register positions except the most significant (e.g., the left-most) positions, and so on. For this example, demultiplexer 599 may not be needed at all, and comparand register position 469 (e.g., the right-most position) may be directly connected to group signal lines 539. Other schemes may also be used.

The translation circuitry described above may also include more than one program register with each program register storing different (or the same) translation information for the decode circuitry. Each program register may selectively provide its translation information to the decode circuitry so as to form different comparands for different lookups. This may be particularly useful, for example, where the input bus is narrower (i.e., has less signal lines) than the total number of input bits in an input string such that multiple clock cycles are used to supply the total input string over the input bus to the CAM device. A separate one of the program registers may be selectively enabled for each clock cycle so as to provide its translation information for a corresponding segment of the input string provided on the input bus at any one time. An exemplary embodiment of the alternative CAM device is shown in FIG. 6A.

Figure 6A:
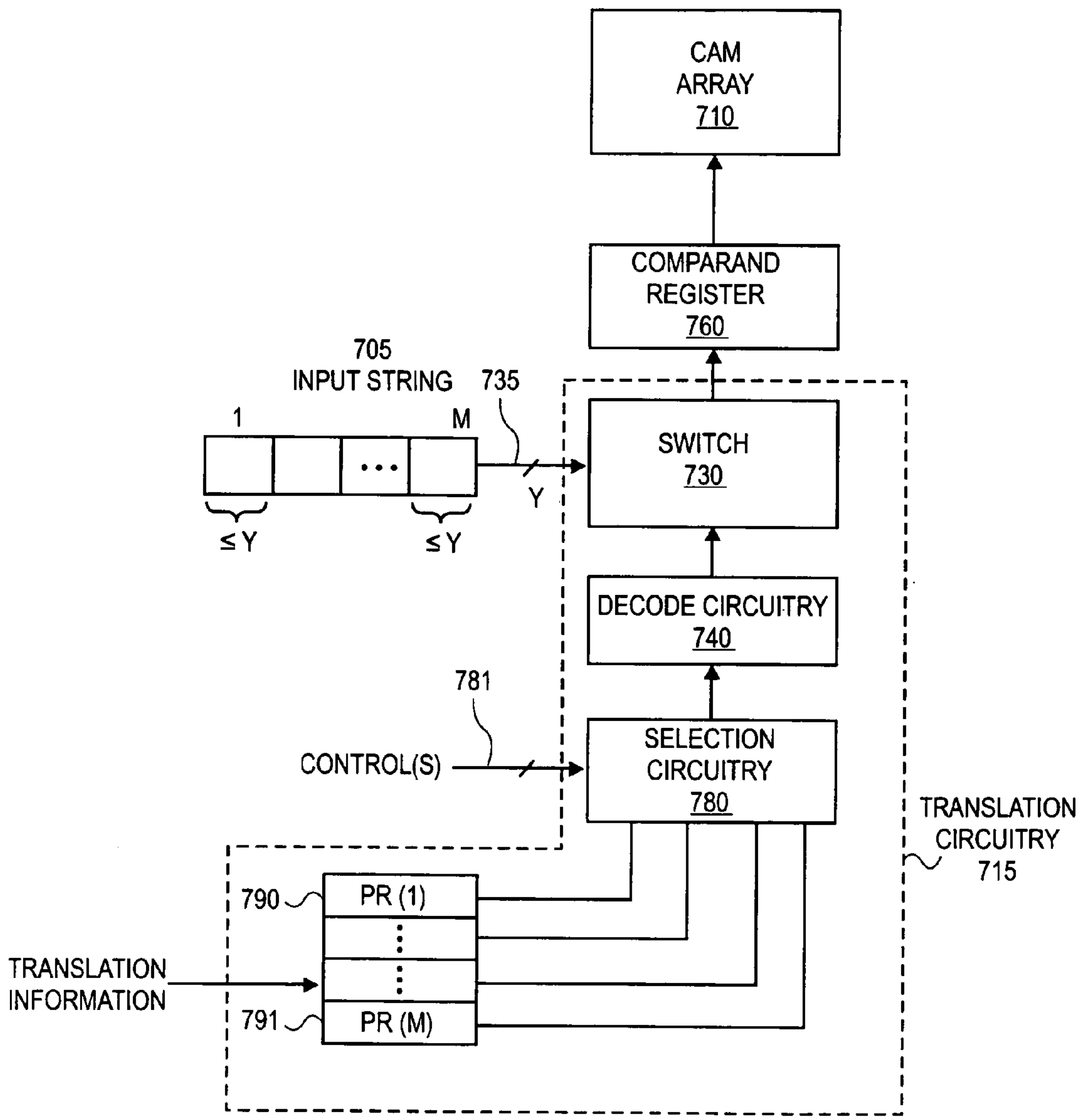
FIG. 6A illustrates an alternative embodiment of a CAM device having multiple program registers.

FIG. 6A illustrates CAM device 700 that includes CAM array 710, comparand register 760, and translation circuitry 715. Translation circuitry 715 includes M number of program registers 790–791 that correspond to the M segments of input string 705. Each of the M segments of input string 705 have a size (i.e., a number of bits or signals) equal to or smaller than Y, where Y is the number of signal lines of input bus 735. The program registers 790–791 are coupled to selection circuitry 780. In one embodiment, selection circuitry 780 may be a M:1 multiplexer (MUX). Each of the program registers 790–791 may be programmed to cause switch 730 to select particular bits or group of bits (e.g., bytes) of the input string segments 705 that are received by switch 730 on a different cycle of device operation. For an example, if the input string 705 is 288 bits in size and the input bus 735 is 72 bits wide, then four cycles would be used to generate a comparand string that includes one or more (or none) of the bit groups from each of the 72 bit segments of the input string.

Selection circuitry 780 is coupled to receive the output of each of the program registers 790–791. One or more control signals may be applied on control line(s) 781 to selection circuitry 780 that selects among the outputs of the program registers 790–791. The control signals may be generated, for example, by processor 310 of FIG. 3A based on the operation cycles of the device, or by an instruction decoder or other control unit within the CAM device. The particular output of the program registers selected by selection circuitry 780 is applied to decode circuitry 740.

Decode circuitry 740 is coupled to receive data that is output from a respective program register to program switch 730 in a manner similar to that discussed above in relation to switch 430 of FIG. 4A. Switch 730 operates to output one or more bits or group of bits of input string segment 705, received on input bus 735, into particular positions of comparand register 760. The operation of switch 730 is based on the data in the program registers decoded by decode circuitry 740. In order to not write over comparand data already stored in a particular comparand segment of comparand register 760 with translation information received in a later cycle, only the register positions that are to contain new data are written in any cycle through the use of the write enable control signals.

Figure 7:
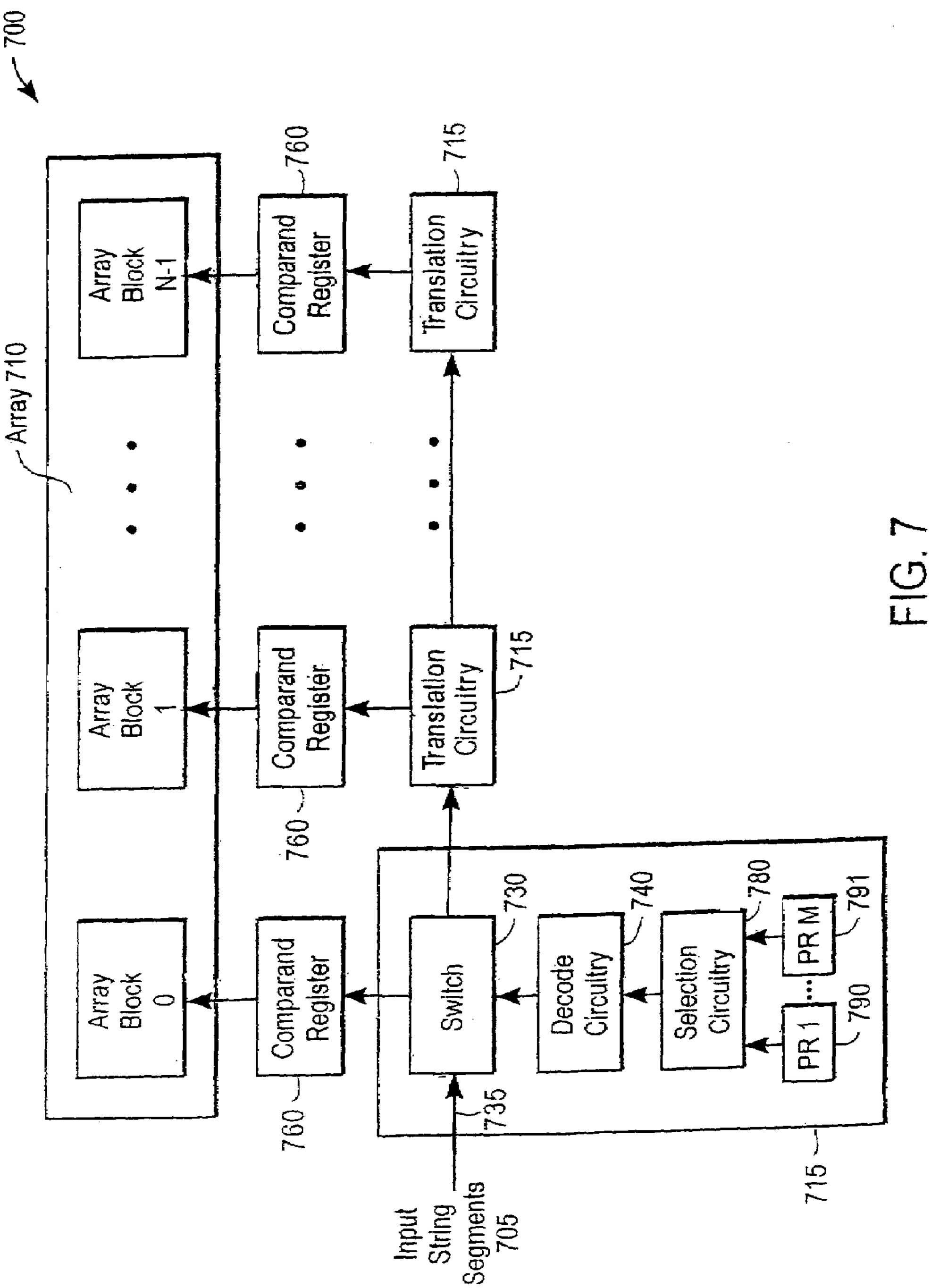
FIG. 7 illustrates one embodiment of a CAM device having a multiple block CAM array and multiple translation circuitry.

Note that the embodiments of the translation circuitry of FIGS. 4B, 5A and 5B may be used to implement the switch 730 of FIG. 7.

Figure 6B:
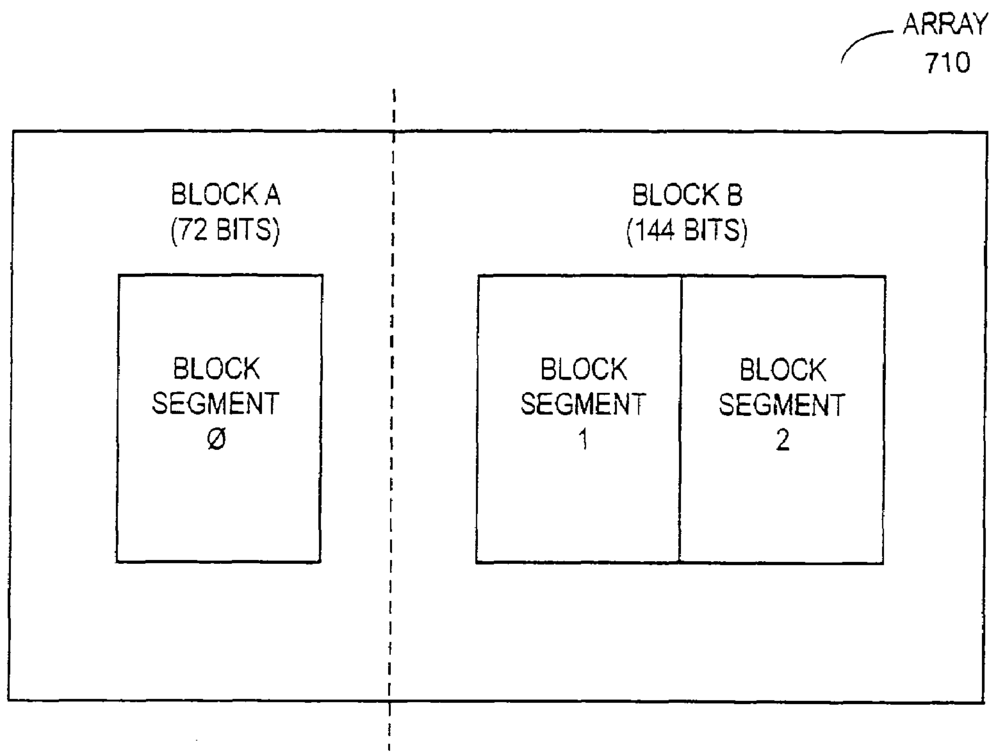
FIG. 6B illustrates one embodiment of a CAM array having multiple blocks and multiple block segments.

In one embodiment, CAM device 320 may be partitioned into multiple blocks or block segments with each block and/or block segments capable of storing different tables for comparand lookups, as illustrated in FIG. 6B.

FIG. 6B illustrates one embodiment of a CAM array having multiple blocks and multiple block segments. In one embodiment, CAM array 710 may be partitioned into two array blocks: block A and block B. The array blocks may be of the same or differing sizes. For example, block A may be 72 bits wide and block B may be 144 bits wide. Each block may have one or more block segments associated with it. For example, block A may include a segment 0 and block B may include block segments 1 and 2. Block 0 may store one lookup table and block segments 1 and 2 may store a different lookup table. Alternatively, different blocks may store the same lookup table.

As discussed above in relation to CAM 320 of FIG. 3A, a block may be an entire array or a portion of a larger array. Although three block segments and two blocks are shown for ease of illustration, a CAM array may have more or less than three block segments and two blocks in alternative embodiments.

To operate with the multiple block configuration of FIG. 6B, a CAM device may include a translation circuit (e.g., such as those described above) each corresponding to one of the blocks. One or more program registers in each of the translation circuitry may be programmed with translation information in order to generate the desired comparand strings for look-ups in blocks A and B, as discussed below in relation to FIG. 7.

FIG. 7 illustrates one embodiment of a CAM device having a multiple block CAM array and multiple translation circuitry. CAM device 700 may be CAM device 320 of FIG. 3A. In one embodiment, CAM device 700 may include a CAM array 710 partitioned into multiple blocks that are organized into one or more arrays with each array and/or block capable of storing different tables for comparand lookups, as discussed above in relation to FIG. 6B. As discussed above, a block may be an entire array itself, or a portion of a larger array and may include one or more smaller portions (e.g., block segments).

CAM device 700 also includes N number of translation circuitry (translation circuitry 0– translation circuitry N−1), each coupled to a corresponding CAM array block (block 0–block N−1). Each translation circuitry is shown as translation circuitry 715 of FIG. 6A; however, any of the translation circuits described in this application may be used for one or more of the CAM array blocks.

Figure 8:
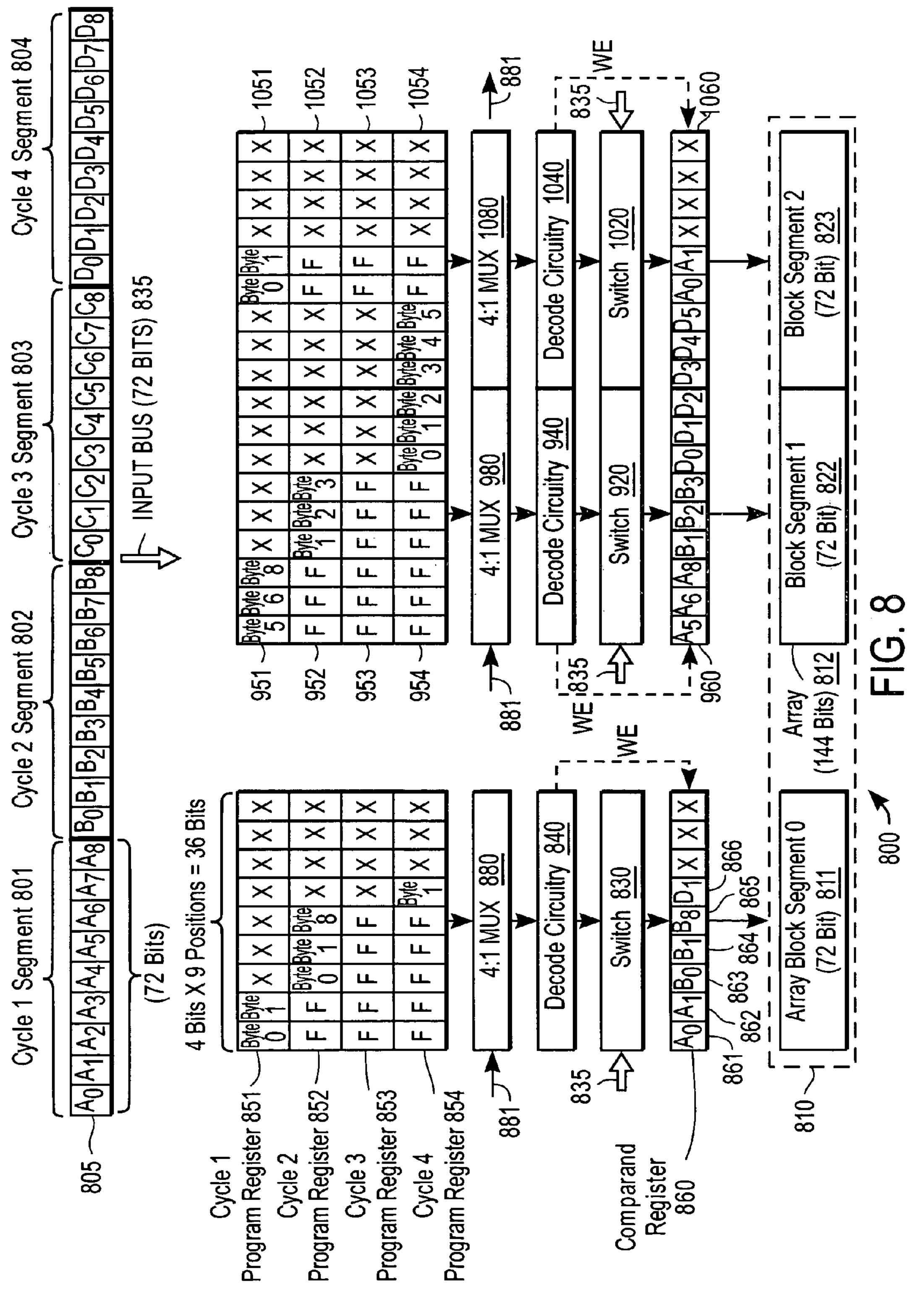
FIG. 8 is an illustration of the multiple cycle operation of the CAM device of FIG. 7.

FIG. 8 is an illustration of the multiple cycle operation of a multiple array CAM device 700 of FIG. 7. In the exemplary embodiment of FIG. 8, CAM device 800 includes a CAM array 810 partitioned into array blocks 811 and 812. Array block 811 includes, for example, a single 72 bit block and Array block 821 includes two 72 bit block segments 822 and 823 (i.e., a 144 bit block). CAM device 800 also includes an input bus 835 having, for example, a 72 bit width. If an input string larger than 72 bits is to be applied to CAM device 800 (e.g., 288 bit input string 805), then all the bits of the input string cannot be applied simultaneously to CAM device 800 on input bus 835. Therefore, multiple operation cycles may be used to apply smaller segments of input string 805 on input bus 835, where each input string segment may have a maximum size of 72 bits. As such, for an input string having a total of 288 bits, four operation cycles may be used to apply input string segments to CAM device 800, where the input string segment for each cycle (cycle 1 segment, cycle 2 segment, cycle 3 segment, cycle 4 segment) is 72 bits. Cycle 1 segment includes 9 bytes (A0–A8), cycle 2 segment includes 9 bytes (B0–B8), cycle 3 segment includes 9 bytes (C0–C8), and cycle 4 segment includes 9 bytes (D0–D8).

PRs 851–854, 951–954, and 1051–1054 are utilized to generate the separate comparand strings stored in comparand registers 860, 960, and 1060, respectively, on different operation cycles of the device. On each operation cycle, PRs 851–854, 951–954, and 1051–1054 may be programmed to select any one of bytes $A_0$–$A_8$, $B_0$–$B_8$, $C_0$–$C_8$, and $D_0$–$D_8$ for loading into any one of the byte positions of comparand registers 860, 960, and 1060. The byte data stored in comparand registers 860, 960, and 1060 may then be used to perform concurrent lookups in CAM block segments 811, 822, and 823, respectively. Alternatively, sequential look-ups may be performed in two or more of the block segments.

PRs 851–854, 951–954, and 1051–1054 may be similar to the program register described above. For example, PRs 851–854, 951–954, and 1051–1054 may each be a nine position register with each register position storing translation information that correlates to a particular byte of input string 805. The information may be stored, for example, in binary format. With such a format, only four bits are needed in each position to reference a particular byte of input string 805 and/or generate a write enable signal. For example, a 0000 binary bit pattern may be used to designate byte 0. As such, each of PRs 851–854, 951–954, and 1051–1054 are 36 bit registers in this exemplary embodiment. In an alternative embodiment, the PRs in each translation circuitry (e.g., PR 851–854) may not be separate registers but, rather, sections of one or more larger registers.

If the comparand strings $A_0A_1B_0B_1B_8D_1$, and $A_5A_6A_8B_1B_2B_3D_0D_1$ $D_2$, $D_3D_4D_5A_0A_1$ are desired for performing lookups in array blocks 811 and 812 (i.e., block segments 822 and 823) respectively, then such comparand strings may be loaded into comparand registers 860, 960, and 1060 respectively, on four cycles of operation by programming PRs 851–854, 951–954, and 1051–1054 accordingly. Alternatively, the comparand string segment for lookup in array bock 812 may be considered as two distinct string segments $A_5A_6A_8B_1B_2B_3D_0D_1D_2$, and $D_3D_4D_5A_0A_1$ corresponding to lookups block segments 822 and 823, respectively.

For ease of discussion, the loading of comparand registers 860, 960, and 1060 will each be discussed separately, below. It should be noted, however, that the components associated with the loading of comparand registers 860, 960, and 1060 may operate concurrently on each given cycle. For example, decode circuitry 840, 940, and 1040 concurrently decodes the translation information programmed in PRs 851, 951, and 1051, respectively, during cycle 1; decode circuitry 840, 940, and 1040 concurrently decodes the translation information programmed in PRs 852, 952, and 1052, respectively, during cycle 2; decode circuitry 840, 940, and 1040 concurrently decodes the translation information programmed in PRs 853, 953, and 1053, respectively, during cycle 3; and decode circuitry 840, 940, and 1040 concurrently decodes the translation information programmed in PRs 854, 954, and 1054, respectively, during cycle 4. In addition, bytes of input string segments 801–804 may be concurrently loaded into comparand registers 860, 960, and 1060, respectively, on a particular cycle, after the translation operation.

With regard to the loading of comparand register 860 with bytes $A_0A_1B_0B_1B_8D_1$: PR 851 may be programmed with the following pattern in its nine positions—0 1 X X X X X X X; PR 852 may be programmed with the pattern—F F 0 1 8 X X X X; PR 853 may be programmed with the pattern—F F F F X X X; and PR 854 may be programmed with the pattern F F F F F 1 X X X.

As previously discussed, the symbols in each register position represents a particular byte number of an input string. As such, the first byte position of PR 851 may actually be storing the bits 0000 that designates byte 0 in a binary format. The symbol X represents a don't care condition where the particular byte position may be overwritten in subsequent cycles and eventually globally masked (or locally masked if the CAM cells are ternary CAM cells) before transmission to the CAM array blocks as discussed above. Alternatively, all the X's may be replaced with F's. F represents a code that instructs decode circuitry to inhibit a write operation. F, in this particular embodiment, is represented by all is, but any other code may be used. Therefore, on the first cycle, a control signal applied to the control input 881 of multiplexer 880 configures multiplexer 880 to select particular bits (e.g., bytes) of the input string 805 designated by the contents of cycle 1 PR 851 for output to decode circuitry 840.

Decode circuitry 840 and switch 830 may operate in a manner similar to that discussed above for decode circuitry 440 and switch 430, to decode the contents of PR 851 and load particular bytes of the input string segment 801 into particular register positions of comparand register 860. With the first position of PR 851 containing a byte 0 designation, decode circuitry 840 instructs switch 830 to load byte 0 of segment 801 (i.e., byte A0) into the first position 861 of comparand register 860. With the second position of PR 851 containing a byte 1 designation, decode circuitry 840 instructs switch 830 to load byte 1 of segment 801 (i.e., byte A1) into the second position 862 of comparand register 860.

On the second cycle, multiplexer 880 may be configured to select particular bits (e.g., bytes) of the input string 805 designated by the contents of cycle 2 PR 852 for output to decode circuitry 840. With the first two positions of PR 852 containing an F bit code, switch 830 is inhibited from writing to bit positions 861 and 862 of comparand register 860. As previously discussed, decode circuitry, for example, decode circuitry 840 may be configured to control when the comparand register 860 is loaded. The write enable signal may be generated based on the decoding of an F code by decode circuitry 840 and operates to control which positions of comparand registers 860 are written to.

In this manner, byte A0 and A1 stored in bit positions 861 and 862, respectively, of comparand register 860 are not over-written. The inhibiting of write operations is known in the art; accordingly a detailed discussion is not provided. With the third position of PR 852 containing a byte 0 designation, and the fourth position of PR 852 containing a byte 1 designation, and the fifth position of PR 852 containing a byte 8 designation, decode circuitry 840 instructs switch 830 to load: byte 0 of segment 802 (i.e., byte B0) into the third position 863 of comparand register 860, byte 1 of segment 802 (i.e., byte B1) into the fourth position 864 of comparand register 860, and byte 8 of segment 802 (i.e., byte B8) into the fifth position 865 of comparand register 860. The X designation in the remaining positions of PR 852 may be globally masked after the loading of comparand register 860 prior to transmitting the contents of comparand register 860 to the array 811

On the third cycle, multiplexer 880 may be configured to select particular bits (e.g., bytes) of the input string 805 designated by the contents of cycle 3 PR 853 for output to decode circuitry 840. Because the desired comparand string to be stored in comparand register 860 does not contain any bytes from input string segment 803, the bit positions of PR 853 contain F designations to prevent the over-writing of previously written to positions of comparand register 860 and X designations of all other bit positions.

On the fourth cycle, multiplexer 880 may be configured to select particular bits (e.g., bytes) of the input string 805 designated by the contents of cycle 4 PR 854 for output to decode circuitry 840. With the first five positions of PR 854 containing an F designation, switch 830 is inhibited from writing to bit positions 861–865 of comparand register 860. In this manner, bytes $A_0A_1B_0B_1B_8$ stored in bit positions 861–865, respectively, of comparand register 860 are not over-written. With the sixth position of PR 854 containing a byte 1 designation, decode circuitry 840 instructs switch 830 to load byte 1 of segment 804 (i.e., byte D1) into the sixth position 866 of comparand register 860. The remaining positions 867–869 (e.g., containing don't cares) do not participate in the subsequent lookup and may be masked out by one or more global mask registers.

In a manner similar to that discussed above, comparand register 960 may be loaded with bytes $A_5A_6A_8B_1B_2B_3D_0D_1D_2$ of input string segments 801–804 by programming: PR 951 with the pattern—5 6 8 X X X X X X; PR 952 with the pattern—F F F 1 2 3 X X X; PR 953 with the pattern—F F F F F F X X X; PR 954 with the pattern—F F F F F F 0 1 2.

Continuing the example, comparand register 1060 may be loaded with bytes $D_3D_4D_5A_0A_1$ of input string segments 801–804 by programming: PR 951 with the pattern—X X X 0 1 X X X X; PR 952 with the pattern—X X X F F X X X X; PR 953 with the pattern—X X X F F X X X X; PR 954 with the pattern—3 4 5 F F X X X. As illustrated by the exemplary pattern loaded in comparand register 1060, bytes from input string segment received in a later cycle (e.g., byte $D_3$ from segment 804) may be loaded into either upper most or lower most positions of the comparand register (e.g., byte $D_3$ loaded into position 1061).

It should be noted that the resulting comparands loaded into comparand registers 860, 960, and 1060 may have different widths. For example, the comparand loaded into comparand register 860 is six bytes wide, the comparand loaded into comparand register 960 is nine bytes wide, and the comparand loaded into comparand register 1060 is 5 bytes wide. Alternatively, comparands of the same widths may be generated and loaded into various comparand registers.

As previously discussed, decode circuitry 840, 940, and 1040 may also be configured to output a write enable (WE) signal to control the loading of comparand registers 860, 960, and 1060, respectively. The write enable signal operates to control when positions of comparand registers 860, 960, and 1060 are written to based on the decoding of the translation information by decode circuitry 840, 940, and 1040, respectively (e.g., write when the translation information is not an F code).

It should also be noted that, the comparands generated by the translation circuitry described in the various embodiments above, may have gaps (e.g., in their register positions such that they are loaded with non-contiguous data) and/or have repeated bits or bit groups. In one embodiment, particular input string bits or bit groups (e.g., byte $A_0$ of FIG. 8) may be translated to be in multiple positions of the same comparand.

Note that the embodiments of FIGS. 6A, 7 and 8 may also use the translation circuitry of FIG. 5B.

By decoding a common input string to generate multiple comparands in parallel, rather than sequentially, concurrent lookups on separate CAM arrays may be performed. Thereby, packet throughput in a CAM may be significantly increased. It should be noted that the number and sizes of the components and cycles of FIG. 8 are only exemplary and that other configurations for a CAM device 700 may be used.

Figure 9:
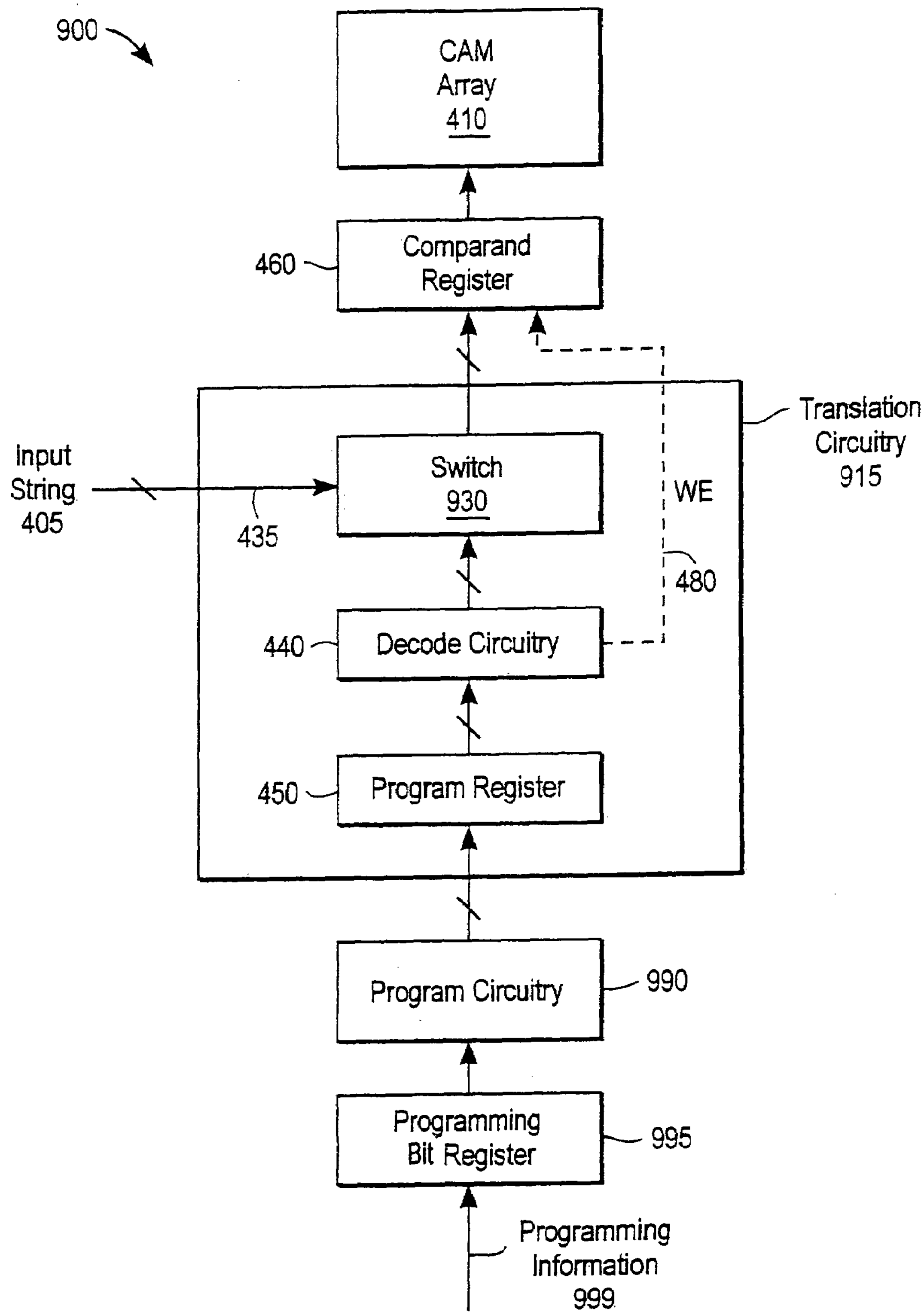
FIG. 9 illustrates one embodiment of CAM device having a program circuit.

FIG. 9 illustrates one embodiment of CAM device 900 having program circuitry. CAM device 900 may be CAM device 320 of FIG. 3A. In one embodiment, CAM device 900 may include CAM array 410, comparand register 460, translation circuitry 915, and program circuitry 990. Program circuitry 990 provides to a user a bit level interface with translation circuitry 915.

CAM array 410, comparand register 460 operate as discussed above in relation to FIG. 4A. Translation circuitry 915 includes input bus 435, switch 930, decode circuitry 440, and program register (PR) 450. Input bus 435, decode circuitry 440, and program register 450 operate as discussed above in relation to FIG. 4A.

Switch 930 is coupled to receive input string 405 via the signal lines of bus 435. Switch 930 represents a matrix of intersections between the signal lines of input bus 435 and positions of comparand register 460. It should be noted that although decode circuitry 440 is illustrated separately from switch 930, the operations of decode circuitry 440 may be incorporated into switch 930 or performed by a separate circuit. In one embodiment, switch 930 may be a cross-bar switch that operates on a per bit group (e.g., per byte) basis. For example, switch 930 may be configured to select particular bytes of input string 405 transmitted on signal lines 435 and load them into certain byte positions of comparand register 460. The bytes on signal lines 435 are selected under the control of decode circuitry 440 and correspondingly output to a particular byte position of comparand register 460. In this manner, one or more bytes of input string 405 may be re-arranged to have a different byte position in a comparand than its position in input string 405.

In one embodiment, program register 450 may be programmed with the translation information that determines how groups of bits (e.g., bytes) of input data from input string 405 are translated to comparand register 460. For this embodiment, program circuitry 990 may be used to provide the user with a bit level interface to the byte information to be stored in program register 450. Program circuitry 990 may be configured to receive programming information 999 in the form of a binary pattern and output translation information in the form of groups of bits (e.g., bytes) to the register positions of program register 450 in a format usable by decode circuitry 440. The programming information 999 may be supplied directly to program circuitry 990 by a user. Alternatively, in one embodiment, the bit data of programming information 999 may be stored in a programming bit storage element, for example, programming bit register 995, for later conversion by program circuitry 990. Alternatively, storage elements other than a register may be used to store the bit data including volatile and non-volatile elements.

Figure 10:
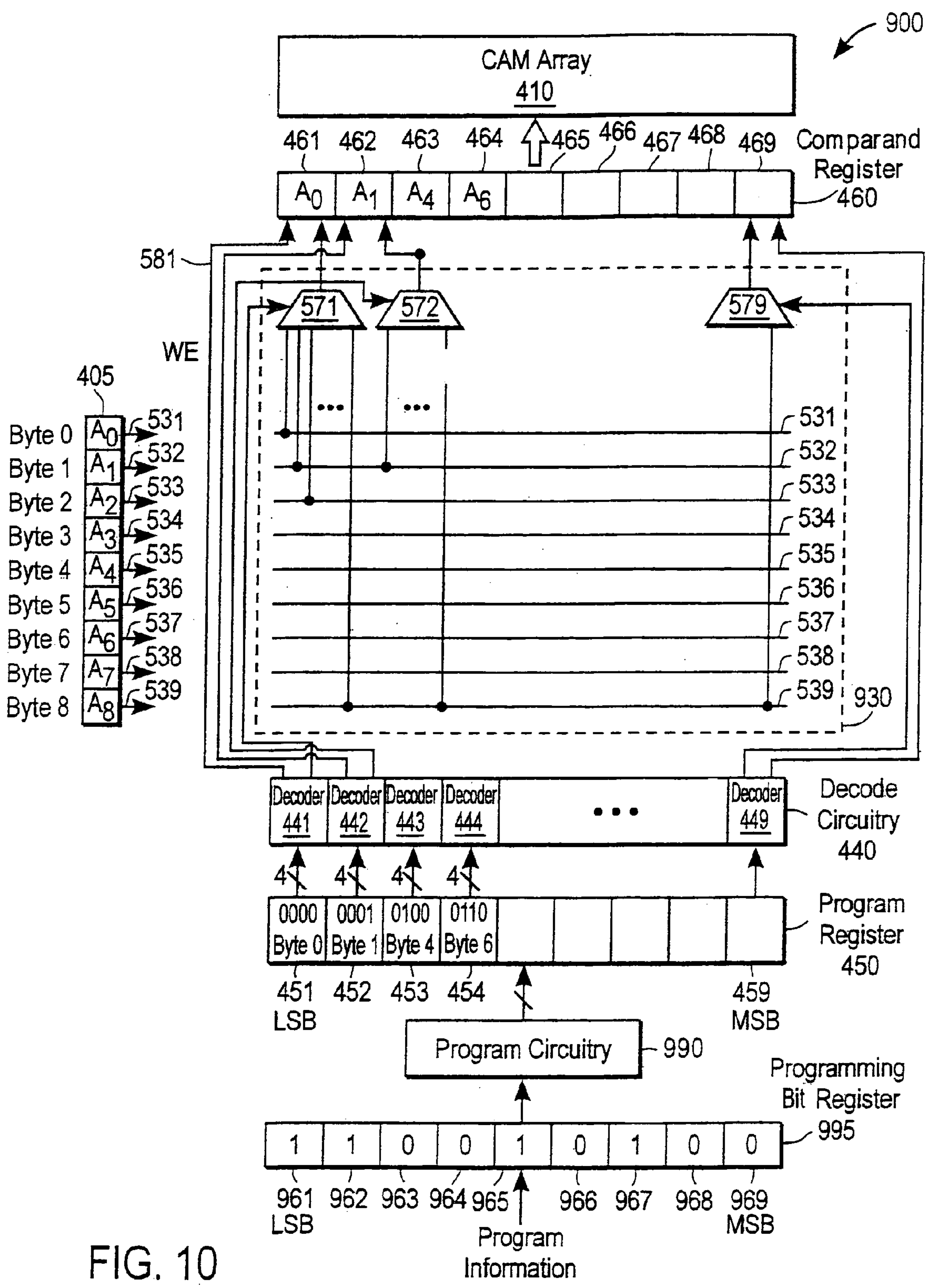
FIG. 10 illustrates another exemplary embodiment of a CAM device having a program circuit.

FIG. 10 illustrates an exemplary embodiment of CAM device 900 showing non-exhaustive exemplary embodiments of switch 930, decode circuitry 440, program register 450, program circuitry 990, and programming bit register 995. In the illustrated embodiment of FIG. 10, switch 930 receives nine groups of signals from signal lines 531–539 of input bus 405. Each of multiplexers 571–579 is coupled to successively fewer of the signal lines 531–539. For example, where signal line 531 is coupled to the least significant position (e.g., byte) of input string 405 and signal line 539 is coupled to the most significant position (e.g., byte) of input string 405, then multiplexer 571 is coupled to all of signal lines 531–539. Correspondingly, multiplexer 572 is coupled to signal lines 532–539, and so on, such that multiplexer 579 is only coupled to signal line 539. Alternatively, switch 930 may include more or less than nine signal lines and nine multiplexers.

In the illustrated exemplary embodiment, decode circuitry 440 includes a corresponding number of decoders 441–449 with the outputs of each decoder coupled to a corresponding one of multiplexers 571–579. For example, the outputs of decoder 441 are coupled to control or select inputs of multiplexer 571 and the outputs of decoder 449 are coupled to control or select inputs of multiplexer 579. Decode circuitry 440 is configured to receive translation information from PR 450 and decode the received translation information in order to control the operation of switch 930.

Each decoder (e.g., decoders 441–449) of decode circuitry 440 is coupled to receive translation information (e.g., one or more bits) from a corresponding register position of PR 450 (e.g., register positions 451–459). PR 450 stores the translation information that is decoded by decode circuitry 440 to program switch 930.

Continuing the example above, PR 450 is a nine position register storing information that correlates to a particular byte of input string 405. The information may be stored, for example, in binary format. With such a format, a group of bits (i.e., four bits) are needed in each position to reference a particular byte of the nine bytes of input string 405. For example, a 0000 bit pattern may be programmed in register position 451 to designate byte 0 ($A_0$) of input string 405; a 0001 bit pattern may be programmed in register position 452 to designate byte 1 ($A_1$) of input string 405; a 0100 bit pattern may be programmed in register position 453 to designate byte 4 ($A_4$) of input string 405; and a 0110 bit pattern may be programmed in register position 454 to designate byte 6 ($A_6$) of input string 405.

Continuing the example, decoder 441 decodes the bit pattern stored in register position 451 and, as a result, outputs control signals to multiplexer 571 to select the byte 0 data ($A_0$) on input signal lines 531 for output to register position 461 of comparand register 460. Decoder 442 decodes the bit pattern stored in register position 452 of PR 450 and, as a result, outputs control signals to multiplexer 572 to select byte 1 data ($A_1$) on input signal lines 532 for output to register position 462 of comparand register 460. Decoder 443 decodes the bit pattern stored in register position 453 of PR 450 and, as a result, outputs control signals to multiplexer 573 (not shown) to select byte 4 data ($A_4$) on input signal lines 535 for output to register position 463 of comparand register 460. Decoder 444 decodes the bit pattern stored in register position 454 of PR 450 and, as a result, outputs control signals to multiplexer 574 (not shown) to select byte 6 data ($A_6$) on input signal lines 537 for output to register position 464 of comparand register 460. The resulting comparand stored in comparand register 460 is $A_0A_1A_4A_6$.

Each of decoders 443–449 may output control signals to multiplexers 571–579, respectively, to select a byte on a particular byte line 531–539 (for output to corresponding comparand register positions 464–469) based on data stored in PR positions 453–459, respectively. As such, PR 450 may be programmed to determine the manner in which the bytes of input string 405 are loaded into comparand register 460 using switch 930. The comparand string may then be used to perform a look-up in CAM array 410.

In one embodiment, each of the decoders of decode circuitry 440 may also be configured to output a write enable (WE) signal on a write enable line. The write enable lines may be coupled to comparand register 460, for example, decoder 441 may output a WE signal on line 581 coupled to byte position 461 of comparand register 460. The write enable signal operates to control when comparand register 460 (or segment thereof) loads the output of a corresponding multiplexer. Comparand register 460 may then output its contents to CAM array 410 in order to perform a look-up. Alternatively, the write enable signal may be generated through other means, for example, with processor 310 of FIG. 3A. Alternatively, the write enable signals may be generated by a control circuit such as an instruction decoder, for example, in response to a write or write and compare instruction that causes comparand register 460 to be selectively loaded by the translation circuitry with data from input bus 435. Decode circuitry 440 may also be configured to receive one or more clock signal(s) from a clock generator (not shown) to control the operation of the decode circuitry. As previously mentioned, the decoders 441–449 may be part of multiplexers 571–579 with the information stored in PR 450 provided directly as select signals to multiplexers 571–579. For another embodiment, a single write enable signal may be provided to more than one segment of comparand register 460.

In one embodiment, program register 450 may be coupled to program circuitry 990 to provide a user with a bit level interface to the bit group information to be stored in each of the register positions of program register 450. Program circuit 990 is configured to receive bit data and output multiple bit group data to the register positions of program register 450. The programming information may be stored in programming bit register 995. Each bit register position 961–969 corresponds to one of the input string 405 bytes, respectively. Each bit register position 961–969 may be programmed with a "1" or a "0" to either select or not select, respectively, a corresponding bit group (e.g., byte) of input string 405 for output to comparand register 460.

Continuing the example of FIG. 10, program circuitry 990 receives a "1" stored in the least significant register position 961 of programming bit register 995 and, as a result, programs register position 451 of program register 450 with the 0000 bit pattern (designating $A_0$ of input string 405). Program circuitry 990 receives a "1" stored in the register position 962 of programming bit register 995 and, as a result, programs register position 452 of program register 450 with the 0001 bit pattern (designating A1 of input string 405). Program circuitry 990 receives a "0" stored in register positions 963 and 964 of programming bit register 995 and, as a result, does not program the next register position of program register 450. Program circuitry 990 receives a "1" stored in register position 965 of programming bit register 995 and, as a result, programs register position 453 of program register 450 with the 0100 bit pattern (designating $A_4$ of input string 405). Program circuitry 990 receives a "0" stored in register position 966 of programming bit register 995 and, as a result, does not program the next register position of program register 450. Program circuitry 990 receives a "1" stored in register position 967 of programming bit register 995 and, as a result, programs register position 454 of program register 450 with the 0110 bit pattern (designating $A_6$ of input string 405). Program circuitry 990 receives a "0" stored in register positions 968 and 969 of programming bit register 995 and, as a result, does not program any of the remaining register position of program register 450. The remaining positions 455–459 of program register 450 may be programmed with codes representing "don't care" conditions as discussed above. In this manner, a user only has to program the 9 bit pattern "110010100" into programming bit register 995 in order to select bytes $A_0A_1A_4A_6$ for generation of a comparand (e.g., stored in comparand register 460) rather than the 36 bits required to directly program program register 450.

In one embodiment, program circuitry may be a memory (e.g., a ROM) storing a look-up table that converts the programming information stored in programming bit register 995 into the translation information (group of bits data) to be stored in program register 450. Alternatively, program circuitry 990 may be implemented in other manners, for examples, using a state machine or with combinational logic circuitry.

Figure 11A:
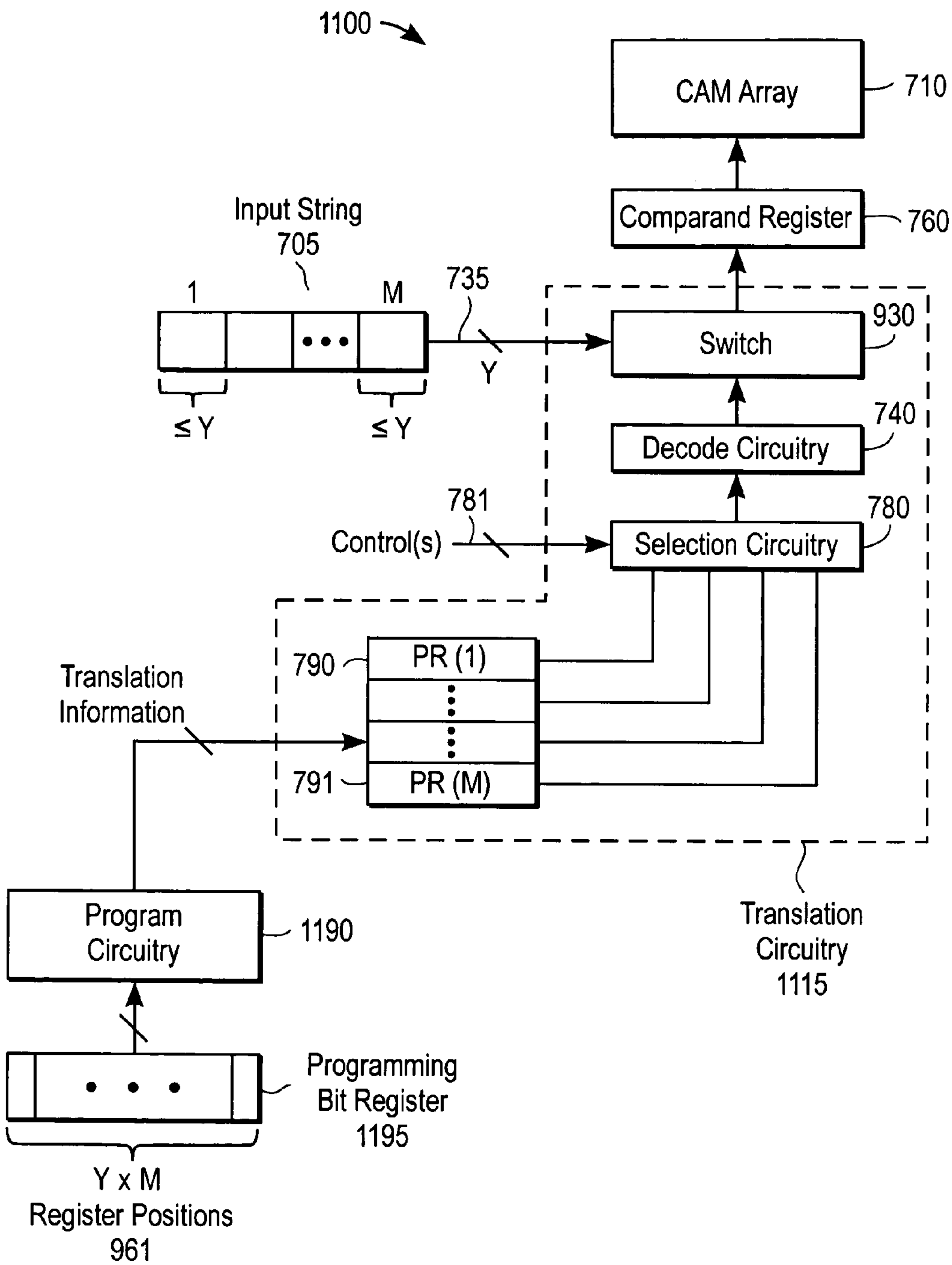
FIG. 11A illustrates an alternative embodiment of a CAM device having a program circuit and multiple program registers.

FIG. 11A illustrates an alternative embodiment of a CAM device having program circuitry and multiple program registers. CAM device 1100 may be CAM device 320 of FIG. 3A. CAM device 1100 includes CAM array 710, comparand register 760, translation circuitry 1115, program circuitry 1190, and programming bit register 1195.

Translation circuitry 1115 includes M number of program registers 790–791 that correspond to the M segments of input string 705. Each of the M segments of input string 705 have a size (i.e., a number of bits or signals) equal to or smaller than Y, where Y is the number of signal lines of input bus 735. The program registers 790–791 are coupled to selection circuitry 780. In one embodiment, selection circuitry 780 may be a M:1 multiplexer (MUX). Each of the program registers 790–791 may be programmed to cause switch 930 to select particular bits or group of bits (e.g., bytes) of the input string segments 705 that are received by switch 930 on a different cycle of device operation. For an example, if the input string 705 is 288 bits in size and the input bus 735 is 72 bits wide, then four cycles would be used to generate a comparand string that includes one or more (or none) of the bit groups from each of the 72 bit segments of the input string.

Selection circuitry 780 is coupled to receive the output of each of the program registers 790–791. One or more control signals may be applied on control line(s) 781 to selection circuitry 780 that selects among the outputs of the program registers 790–791. The control signals may be generated, for example, by processor 310 of FIG. 3A based on the operation cycles of the device, or by an instruction decoder or other control unit within the CAM device. The particular output of the program registers selected by selection circuitry 780 is applied to decode circuitry 740.

Decode circuitry 740 is coupled to receive data that is output from a respective program register to program switch 930 in a manner similar to that discussed above in relation to FIG. 9. Switch 930 operates to output one or more bits or group of bits of input string segment 705, received on input bus 735, into particular positions of comparand register 760. The operation of switch 930 is based on the data in the program registers decoded by decode circuitry 740. In order to not write over comparand data already stored in a particular comparand segment of comparand register 760 with translation information received in a later cycle, only the register positions that are to contain new data are written in any cycle through the use of the write enable control signals.

In one embodiment, program circuitry 1190 is coupled to program registers 790–791 to provide a user with a bit level interface to the translation information (group of bits) to be stored in each of the register positions of program registers 790–791. Program circuitry 1190 is configured to receive programming information and output translation information to each of the register positions of each of program registers 790–791. The programming information may be stored in programming bit register 1195.

In one embodiment, programming bit register 1195 may have (M*Y) register positions 961 with each bit register position corresponding to one of the input string 705 bytes received in a particular cycle. Alternatively, where the group of bits has a size greater or less than a byte, programming bit register 1195 has a corresponding number of register positions. Each of the bit register positions 961 may be programmed with a "1" or a "0" to either select or not select, respectively, a corresponding group of bits (e.g., byte) of input string 705 for output to comparand register 760. Alternatively, each of the bit register positions 961 may be programmed with a "0" or a "1" to either select or not select, respectively, a corresponding group of bits (e.g., byte) of input string 705. Each of the program registers 790–791 may be programmed by programming circuitry 1190 using the binary data pattern stored in programming bit register 1195.

Figure 11B:
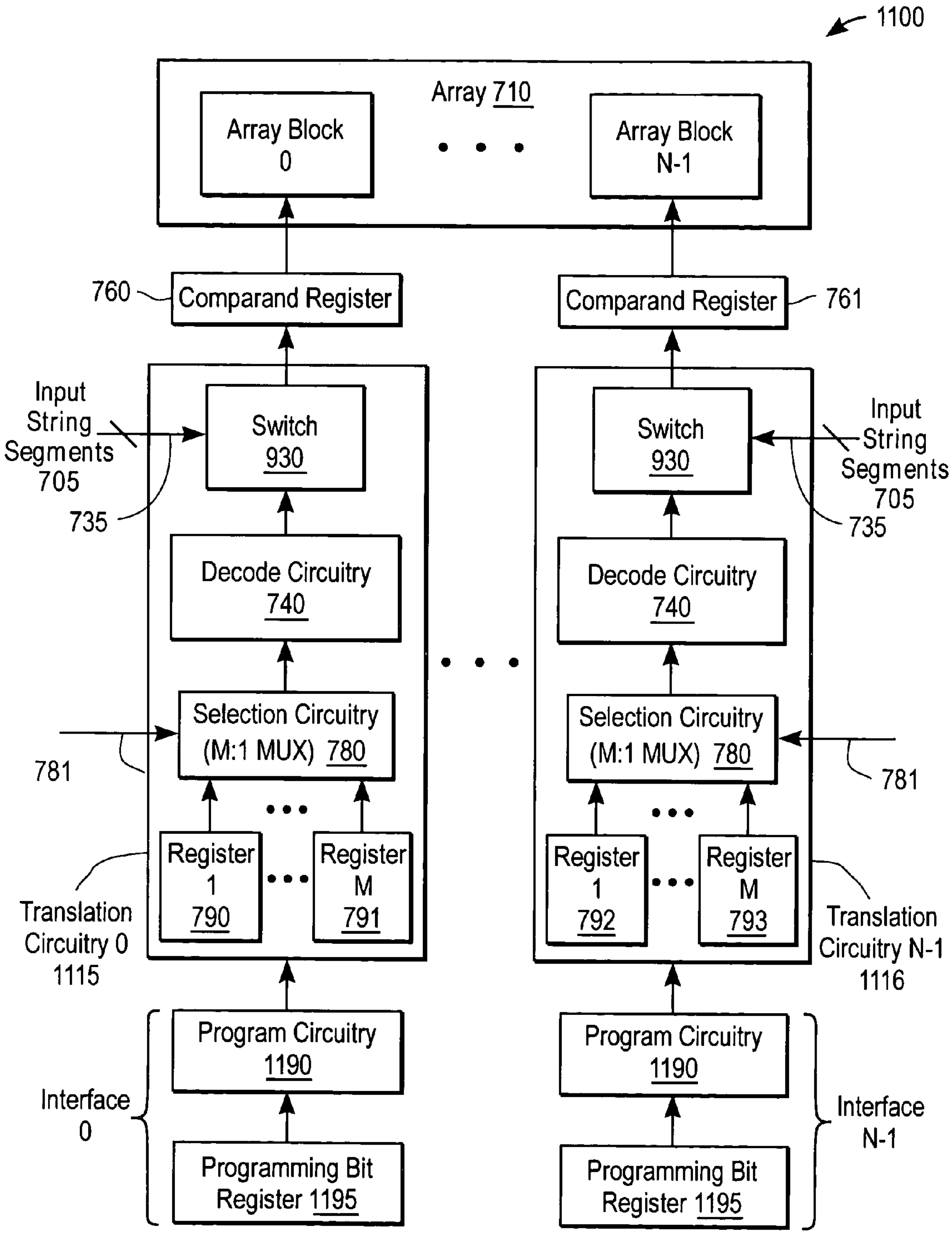
FIG. 11B illustrates one embodiment of a CAM device having a multiple block CAM array and program circuitry.

FIG. 11B illustrates one embodiment of a CAM device having a multiple block CAM array and program circuitry. As previously discussed, to operate with the multiple block configuration of FIG. 6B, a CAM device may include translation circuitry (e.g., such as those described above) each corresponding to one of the blocks. CAM device 1100 may be CAM device 320 of FIG. 3A. In one embodiment, CAM device 1100 may include a CAM array 710 partitioned into multiple blocks that are organized into one or more arrays with each array and/or block capable of storing different tables for comparand lookups, as discussed above in relation to FIG. 6B.

CAM device 1100 also includes N number of translation circuitry (translation circuitry 0-translation circuitry N−1), each coupled to a corresponding CAM array block (block 0–block N−1), shown as translation circuitry 1115 to translation circuitry 1116 of FIG. 11A. However, any of the translation circuits described in this application may be used for one or more of the CAM array blocks. One or more program registers in each of the translation circuitry may be programmed with translation information in order to generate the desired comparand strings for look-ups in blocks 0 to N−1.

CAM device 1100 also includes N number of interfaces (interface 0–interface N−1), each coupled to a corresponding translation circuitry (translation circuitry 0–translation circuitry N−1), shown as program circuitry 1190 and programming bit register 1195. For example, program circuitry 1190 is coupled to program registers 790–791 in translation circuitry 1115 to provide a user with a bit level interface to the multi-bit information to be stored in each of the register positions of the program registers 790–791. The corresponding programming information may be stored in programming bit register 1195.

Figure 12:
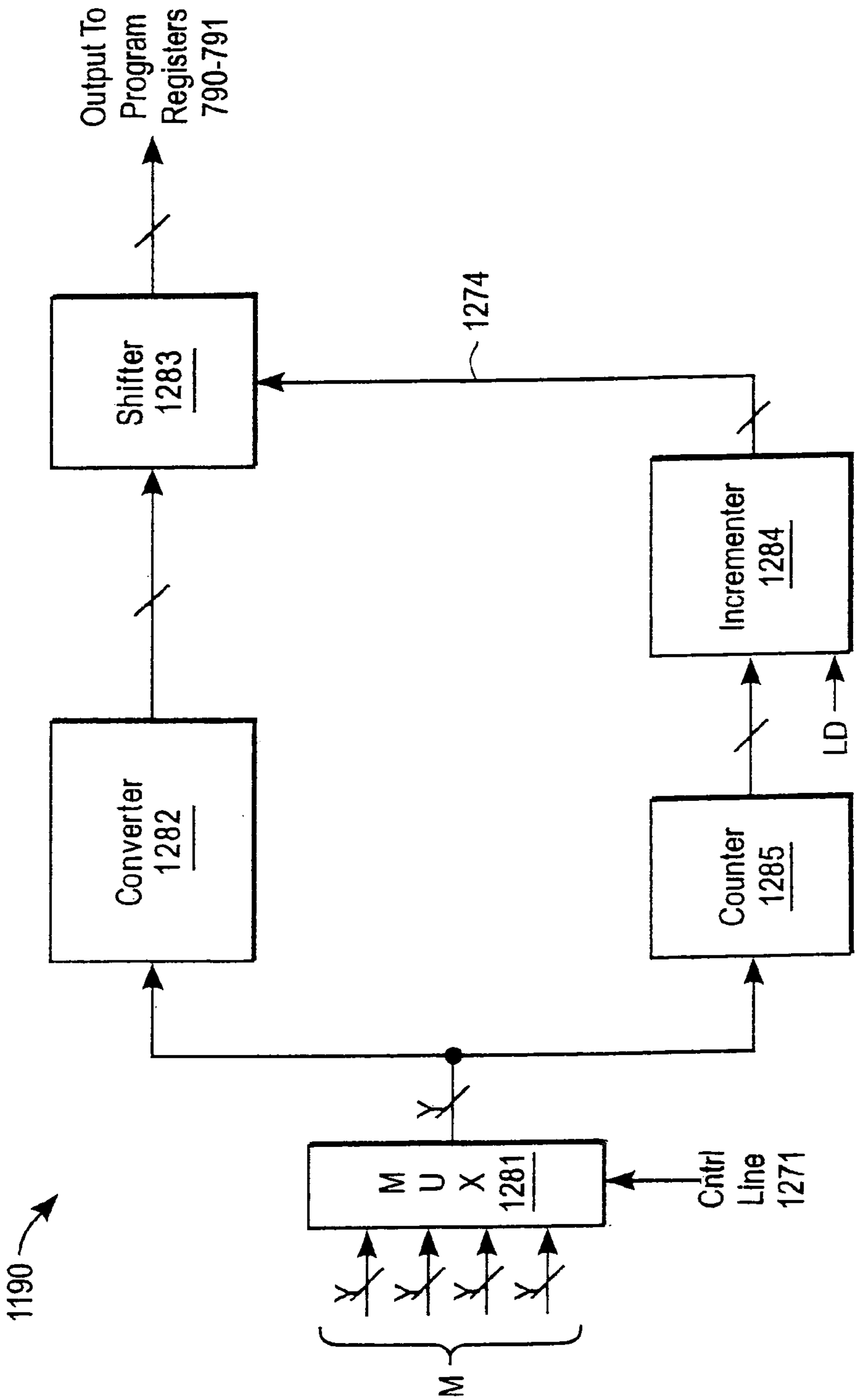
FIG. 12 illustrates one embodiment of program circuitry.

FIG. 12 illustrates one embodiment of program circuitry 1190. In one embodiment, program circuitry 1190 includes multiplexer 1281, converter 1282, shifter 1283, incrementer, 1284, and counter 1285. Multiplexer 1281 is coupled to receive programming information (of Y bit size) from the M different segments of programming bit register 1195 or, alternatively, from M number of programming bit registers (each having a Y bit size). Multiplexer 1281 is configured to select from among the M number of received bit data and output a selected bit data based on a control signal (e.g., a cycle indicator) received on control signal line(s) 1271. The control signals may be generated, for example, by processor 310 of FIG. 3A based on the operation cycles of the device, or by an instruction decoder or other control unit within the CAM device. The output of multiplexer 1281 is coupled to converter 1282 and counter 1285. Converter 1282 operates to convert the binary pattern programming information output from multiplexer 1281 into the translation information, having the format usable by decode circuitry 740 of FIG. 11A, for selection of segments of the input string 705. For example, where a 4 bit binary code is used to reference a particular byte of Y bytes of input string 705, then converter 1282 outputs a 4*Y pattern to shifter 1283. In one embodiment, converter 1282 may be a memory (e.g., a ROM) storing a look-up table that converts the received bit data into the format suitable for use by decoder 740. Alternatively, converter 1282 may be other types of memory devices or may be implemented in other manners, for examples, as a state machine or with combinational logic circuit.

Shifter 1283 is coupled to receive the output of converter 1282. On the first cycle of device operation, shifter passes through the translation information received from converter 1283 to one of program registers 790–791 designated for storing the programming data for the first cycle. On subsequent cycles, shifter 1283 shifts the translation information by the number of "1"s in the bit data output by multiplexer 1281. The translation information output by shifter 1283 can then be provided to one or more program registers such as program registers 790–791 shown in FIG. 11A. Each program register, or section(s) thereof, can be selected by one or more control signals (e.g., the control signal(s) provided on control lines 1271).

Counter 1285 counts the number of "1"s in the bit data received from multiplexer 1281 and outputs the result to incrementer 1284. Incrementer 1284 is coupled to receive the output of counter 1285. In one embodiment, incrementer 1284 starts at zero and increments a shift amount by the number of "1"s counted by counter 1285. This shift amount is output to shifter 1283 via line(s) 1274 and controls the number of register positions that shifter 1283 shifts the translation information.

Figure 13:
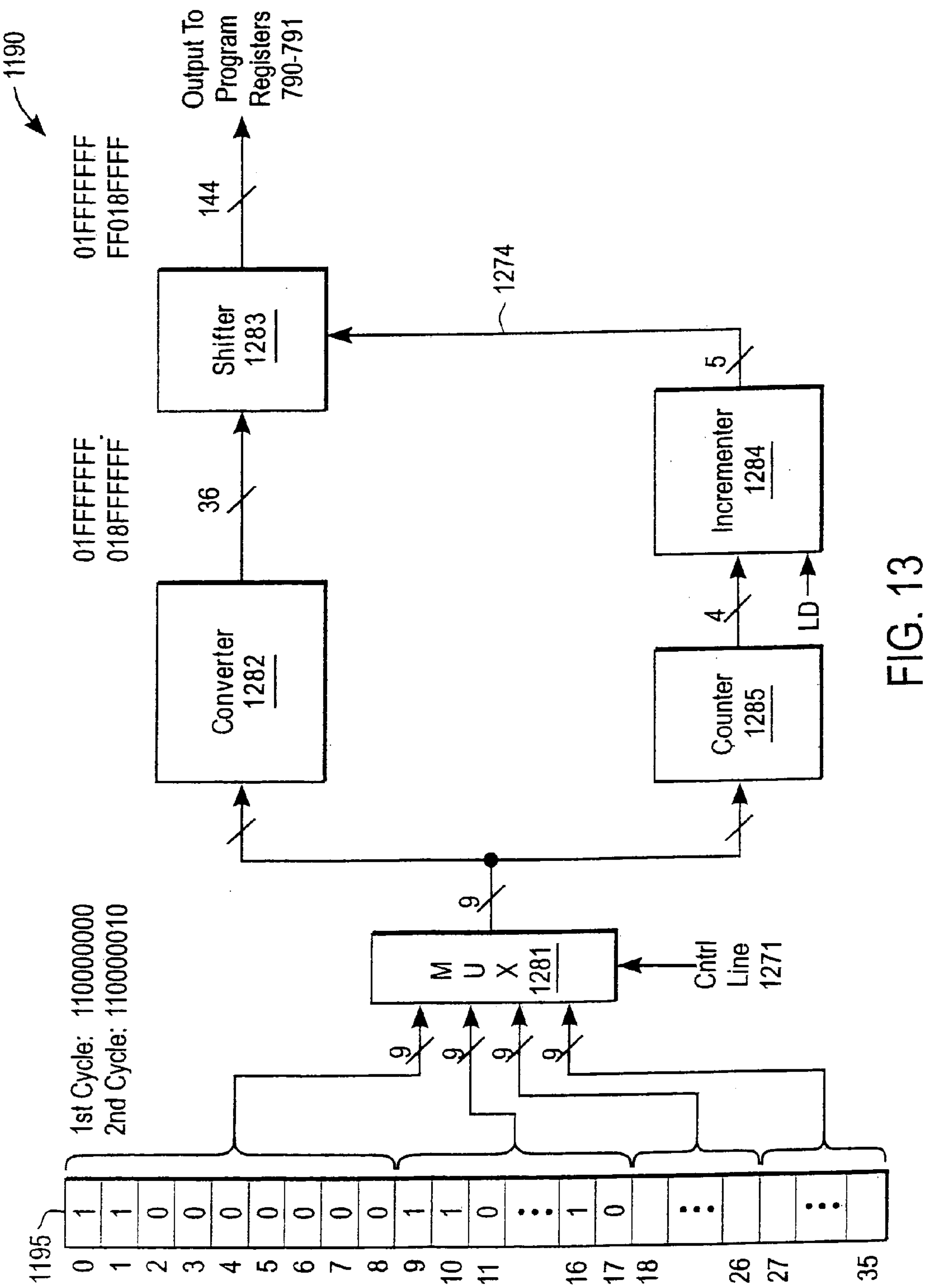
FIG. 13 illustrates an exemplary embodiment of CAM device showing non-exhaustive exemplary embodiments of program circuitry and a programming bit register.

FIG. 13 illustrates an exemplary embodiment of CAM device 1100 showing non-exhaustive exemplary embodiments of program circuitry 1190 and programming bit register 1195. Continuing the example discussed above in relation to FIG. 11A, programming bit register 1195 has 36 bit positions for an input string 705 that is 288 bits in size and an input bus that is 72 bits wide, where four cycles are used to generate a comparand string. Each bit position of programming bit register 1195 corresponds to a byte of input string 705 received on a particular cycle of device operation. For example, the first 9 register positions of programming bit register 1195 correspond to the first nine bytes of input string 705 received on the first cycle of operation, the second 9 register positions of programming bit register 1195 correspond to the second nine bytes of input string 705 received on the second cycle of operation, the third 9 register positions of programming bit register 1195 correspond to the third nine bytes of input string 705 received on the third cycle of device operation, and the fourth 9 register positions of programming bit register 1195 correspond to the fourth nine bytes of input string 705 received on the fourth cycle of device operation. Alternatively, multiple programming bit registers may be used, with each of the multiple programming bit registers corresponding to one of the program registers 790–791.

The first nine register positions of programming bit register 1195, for example, store the pattern 110000000 and the second nine register positions of programming bit register 1195, for example, store the pattern 110000010. Multiplexer 1281 may be used to select the output of the first nine register positions on a first device operation cycle using control line 1271 as discussed above in relation to FIG. 12. The multiplexer 1281 outputs pattern 110000000 to converter 1282. Converter 1282 converts the received pattern to the corresponding translation information code 01FFFFFFF (representing the binary pattern 000000011111111111111111111111111111) and outputs the translation information to shifter 1283. In this case, F represents a code that instructs decode circuitry 840 to inhibit a write operation. F, in this particular embodiment, is represented by all 1s, but any other code may be used.

Shifter 1283 then outputs the translation information to a program register of a translation circuitry, for example, program register 1451 of FIG. 14 as discussed below in more detail. Multiplexer 1281 also outputs pattern 110000000 to counter 1285. Counter 1285 determines that there are two "1"s in the pattern and outputs this information to incrementer 1284.

On the second device operation cycle, multiplexer 1281 may be used to select the output of the second nine register positions using control line 1271. The multiplexer 1281 outputs pattern 110000010 to converter 1282. Converter 1282 converts the received pattern to the corresponding translation information code 018FFFFFF (representing the binary pattern 000000011000111111111111111111111111) and outputs the translation information to shifter 1283. Incrementer 1284 outputs a control signal to shifter 1283 via control line(s) 1274 indicating the number of register positions to shift the translation information based on the number of "1"s in the previous pattern determined by counter 1285, in this example, two. Shifter 1283 shifts the translation information pattern by two byte positions and outputs the shifted information pattern code, FF018FFFF, to a program register of a translation circuitry, for example, program register 1452 of FIG. 14. Multiplexer 1281, converter 1282, shifter 1283, counter 1285, and incrementer 1284 operate in a similar manner on subsequent device operation cycles to load the other program registers.

Figure 14:
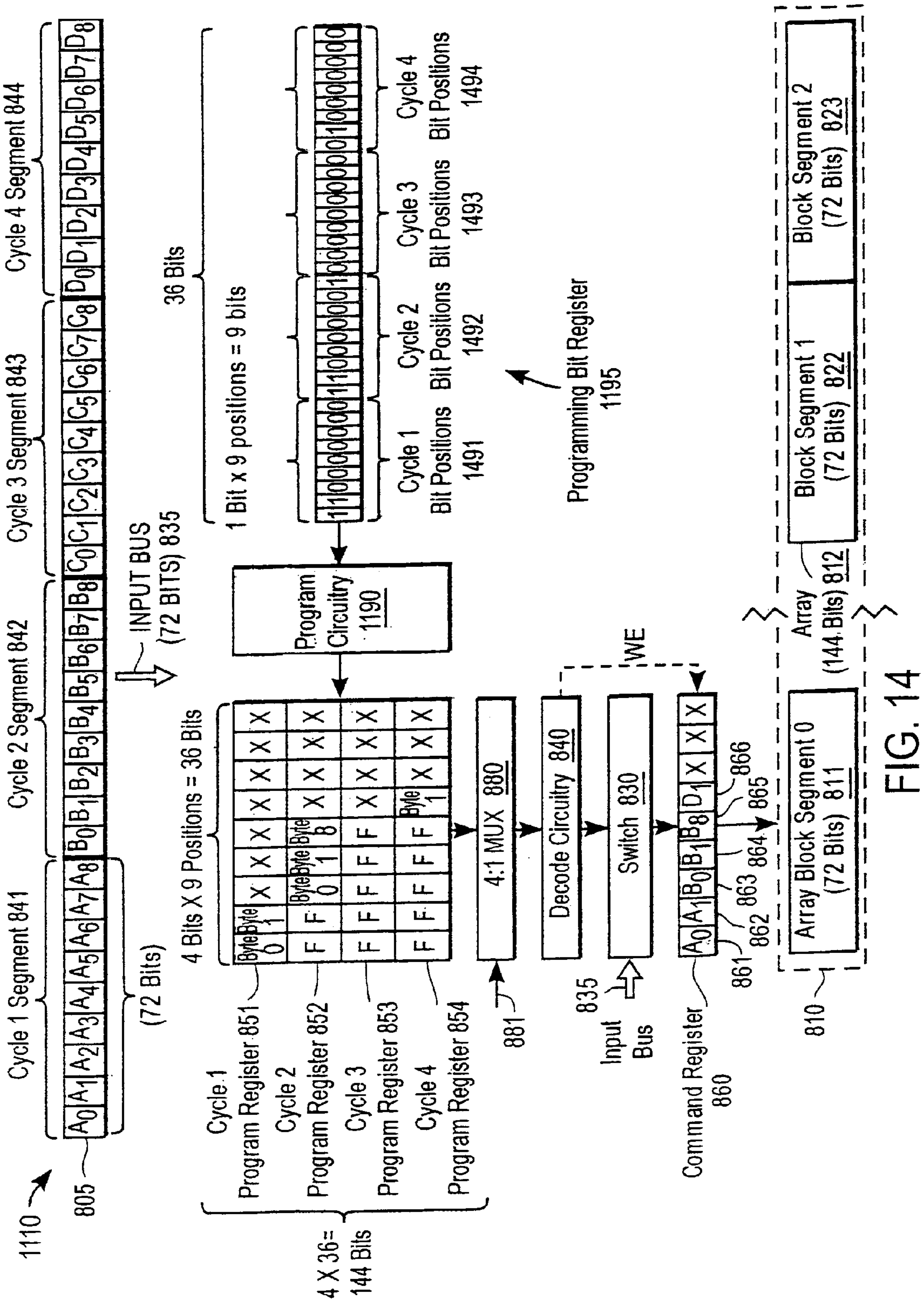
FIG. 14 is an illustration of the multiple cycle operation of a multiple array CAM device having program circuitry and a programming bit register.

FIG. 14 is an illustration of the multiple cycle operation of a multiple array CAM device. In the exemplary embodiment of FIG. 14, CAM device 1100 includes a CAM array 810 partitioned into array blocks 811 and 812. Array block 811 includes, for example, a single 72 bit block and Array block 821 includes two 72 bit block segments 822 and 823 (i.e., a 144 bit block). The translation circuitry and associated programming circuitry and programming bit register is only shown for a single block for ease of illustration. However, it will be apparent to one of skill in the art that translation circuitry, program circuitry and programming bit registers associated with the other blocks of CAM array 810 may be programmed with translation information in a manner similar to that discussed below with respect to the translation circuitry of block 811, program circuitry 1190 and programming bit register 1195.

CAM device 1100 also includes an input bus 835 having, for example, a 72 bit width. If an input string larger than 72 bits is to be applied to CAM device 1100 (e.g., 288 bit input string 805), then all the bits of the input string cannot be applied simultaneously to CAM device 1100 on input bus 835. Therefore, multiple operation cycles may be used to apply smaller segments of input string 805 on input bus 835, where each input string segment may have a maximum size of 72 bits. As such, for an input string having a total of 288 bits, four operation cycles may be used to apply input string segments to CAM device 1100, where the input string segment for each cycle (cycle 1 segment, cycle 2 segment, cycle 3 segment, cycle 4 segment) is 72 bits. Cycle 1 segment includes 9 bytes (A0–A8), cycle 2 segment includes 9 bytes (B0–B8), cycle 3 segment includes 9 bytes (C0–C8), and cycle 4 segment includes 9 bytes (D0–D8).

Programming bit register 1195 and program circuitry 1190 are utilized to encode data for program registers (PRs) 851–845. PRs 851–854 are utilized to generate the separate comparand strings stored in comparand register 860 on different operation cycles of the device. On each operation cycle, PRs 851–854 may be programmed, based on the programming information in programming bit register 1195, to select one of bytes $A_0$–$A_8$, $B_0$–$B_8$, $C_0$–$C_8$, and $D_0$–$D_8$ for loading into any one of the byte positions of comparand register 860. The byte data stored in comparand registers 860 may then be used to perform a lookup in CAM block segment 811.

For example, PRs 851–854, may each be a nine position register with each register position storing translation information that correlates to a particular byte of input string 805. The information may be stored, for example, in binary format. With such a format, four bits are needed in each position to reference a particular byte of input string 805 and/or generate a write enable signal. For example, a 0000 binary bit pattern may be used to designate byte 0. As such, each of PRs 851–854 are 36 bit registers in this exemplary embodiment, resulting in a total of 144 bit register positions. Alternatively, the PRs 851–854 may not be separate registers but, rather, sections of one or more larger registers.

If the comparand string $A_0A_1B_0B_1B_8D_1$ is desired for performing a lookup in array block 811, then such a comparand string may be loaded into comparand registers 860 on four cycles of operation by programming PRs 851–854. Using programming bit register 1195 and program circuitry 1190, PR 851 may be programmed with the following pattern in its nine positions—0 1 X X X X X X X; PR 852 may be programmed with the pattern—F F 0 1 8 X X X X; PR 853 may be programmed with the pattern—F F F F F X X X; and PR 854 may be programmed with the pattern F F F F F 1 X X X.

As previously discussed, the symbols in each register position represents a particular byte number of an input string. As such, the first byte position of PR 851 may actually be storing the bits 0000 that designates byte 0 in a binary format. The symbol X represents a don't care condition where the particular byte position may be overwritten in subsequent cycles and eventually globally masked (or locally masked if the CAM cells are ternary CAM cells) before transmission to the CAM array blocks as discussed above. Alternatively, all the X's may be replaced with F's. F represents a code that instructs decode circuitry to inhibit a write operation. F, in this particular embodiment, is represented by all is, but any other code may be used.

Programming bit register 1195 is a 36 bit register having sections that correspond to each of the program registers 851–854. To program PR 851 with its corresponding 36 bit pattern, the following binary pattern may be stored in the first cycle register positions 1491 of programming register 1195—110000000. To program PR 852 with its corresponding 36 bit pattern, the following binary pattern may be stored in the second cycle register positions 1492 of programming register 1195—110000010. To program PR 853 with its corresponding bit pattern, the following binary pattern may be stored in the third cycle register positions 1493 of programming register 1195—000000000. To program PR 854 with its corresponding 36 bit pattern, the following binary pattern may be stored in the fourth cycle register positions 1494 of programming register 1195—100000000. Program circuitry 1190 operates in a manner as discussed above in relation to FIG. 13 to generate the resulting patterns in program registers 851–854. Program registers 851–854, multiplexer 880, decode circuitry 840, and switch 830 operate in a manner similar to that discussed above with respect to FIG. 8 to generate the resulting comparand $A_0A_1B_0B_1B_8D_1$ in comparand register 860.

As such, a 36 bit binary pattern may be used to program the total 144 bits of all of program registers 851–854. Moreover, a user need only program a single bit using programming bit register 1195 to designate a particular byte of input string 805.

It should be noted that the number and sizes of the components and cycles of FIG. 14 are only exemplary and that other configurations for a CAM device 1100 may be used.

Any of the signals provided over the various buses may be time multiplexed with other signals and provided over one or more common buses.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of operating a content addressable memory (CAM) device, comprising:

receiving an input data having a plurality of bit groups, wherein a first bit group has a first position in the input data relative to other bit groups;

programming first translation information using a bit in a binary pattern to represent the first bit group;

translating, in response to the first translation information, the first bit group from the first position to a different position in a comparand; and comparing the comparand with data stored in a CAM array.

2. The method of claim 1, wherein programming comprises converting the bit of the binary pattern into a multiple bit pattern for the first translation information.

3. The method of claim 1, wherein the binary pattern has a fewer number of bits than the translation information.

4. The method of claim 2, wherein the translating comprises establishing switch connections between the first position of the input data and the position of the comparand.

5. The method of claim 4, wherein the first translation information determines the position of the comparand register that the first bit group is translated to.

6. An apparatus, comprising:

a content addressable memory (CAM) array to receive a comparand;

a program circuitry to convert a binary pattern into translation information, each bit of the binary pattern corresponding to a respective bit group of an input data having a plurality of bit groups; and a translation circuitry coupled to the program circuitry, the translation circuitry having at least one first input, at least one second input, and at least one output, wherein the first input is configured to receive the input data, wherein a first bit group has a first position in the input data relative to other bit groups, wherein the second input is configured to receive the translation information indicative of translation of the first bit group from the first position to a different position in a comparand, the output coupled to the CAM array to transmit the comparand to the CAM array.

7. The apparatus of claim 6, further comprising a first storage element coupled to the program circuitry to store the binary pattern and wherein each bit of the binary pattern represents each of the plurality of bit groups of the translation information.

8. The apparatus of claim 7, wherein the first storage element is a programmable bit register.

9. The apparatus of claim 6, wherein the programming circuitry comprises a lookup table.

10. The apparatus of claim 6, wherein the programming circuitry comprises a ROM to store a lookup table.

11. The apparatus of claim 6, wherein the programming circuitry comprises a state machine.

12. The apparatus of claim 6, wherein the programming circuitry comprises:

a multiplexer;

a counter coupled with the multiplexer;

a converter coupled with the multiplexer;

a shifter coupled with the converter; and an incrementer coupled with the counter and the shifter.

13. The apparatus of claim 6, wherein the translation circuitry comprises a storage element to store the translation information and the program circuitry is coupled with the storage element.

14. The apparatus of claim 12, wherein the translation circuitry comprises a first storage element to store the translation information and wherein the shifter is coupled with the first storage element.

15. The apparatus of claim 14, further comprising a second storage element coupled to the program circuitry to store the binary pattern and wherein each bit of the binary pattern represents each of the plurality of bit groups of the translation information.

16. The apparatus of claim 7, wherein the first storage element has a plurality of sections, each of the plurality of sections to store a portion of the binary pattern.

17. The apparatus of claim 16, wherein the apparatus further comprises:

a plurality of storage elements, each of the plurality of storage elements to store a portion of the translation information;

selection circuitry coupled to the plurality of storage elements to select from among the plurality of storage elements; and a decode circuitry coupled to the plurality of selection circuitry to decode the portion of the translation information and to establish a switch circuit connection between the first position and the position in the comparand.

18. The apparatus of claim 17, wherein each of the plurality of storage elements is configured to store a portion of the translation information for one cycle of a plurality of cycles, and the selection circuitry is configured to select from among the plurality of storage elements based on a particular cycle of the plurality of cycles, wherein the program circuitry is configured to select from among the plurality of sections of the binary pattern based on the particular cycle.

19. An apparatus, comprising:

a content addressable memory (CAM) array having a plurality of CAM blocks each configured to receive a comparand;

a plurality of program circuitry, each of the plurality of program circuitry to convert a binary pattern into respective translation information; and a plurality of translation circuitry, each of the plurality of translation circuitry coupled to a corresponding one of the plurality of CAM blocks and a corresponding one of the plurality of program circuitry, each translation circuitry having at least one first input, at least one second input, and at least one output, wherein the first input is configured to receive an input data having a plurality of bit groups, wherein a first bit group has a first position in the input data relative to other bit groups, wherein the second input is configured to receive translation information indicative of translation of the first bit group from the first position to a different position in the comparand receive by a respective CAM block, the output coupled to transmit the comparand to the CAM block.

20. The apparatus of claim 19, further comprising a plurality of storage elements coupled to a corresponding one of the plurality of program circuitry to store the binary patterns and wherein each bit of the binary patterns represents each of the plurality of bit groups of the translation information.

21. The apparatus of claim 20, wherein each of the plurality of translation circuitry are configured to concurrently transmit the respective comparand to the respective CAM block.

22. The apparatus of claim 19, wherein each of the plurality of program circuitry are configured to convert respective binary patterns that correspond to multiple operation cycles.

23. The apparatus of claim 19, wherein each of the programming circuitry comprises a converter.

24. The apparatus of claim 23, wherein the converter comprises a lookup table.

25. The apparatus of claim 23, wherein each of the programming circuitry further comprises:

a multiplexer;

a counter coupled with the multiplexer;

a converter coupled with the multiplexer;

a shifter coupled with the converter; and an incrementer coupled with the counter and the shifter.

26. The apparatus of claim 19, wherein two or more of the program circuitry are configured to concurrently convert binary patterns into respective translation information.

27. A content addressable memory (CAM) device, comprising:

a CAM array to receive a comparand;

a switch circuit having an input and an output, the input configured to receive input data having a plurality of bit groups, wherein a first bit group has a first position in the input data relative to other bit groups, the output coupled to the CAM array to transmit the comparand to the CAM array;

a storage element to store a translation information indicative of a translation of the first bit group from the first position to a different position in the comparand; and a program circuitry to convert a binary pattern into the translation information, each bit of the binary pattern corresponding to a respective bit group of the plurality of bit groups.

28. The CAM device of claim 27, further comprising a register coupled to the program circuitry to store the binary pattern and wherein each bit of the binary pattern represents each of the plurality of bit groups of the translation information.

29. The CAM device of claim 27, wherein the binary pattern has a plurality of sections, each section corresponding to a portion of the translation information for one cycle of a plurality of operation cycles.

30. The CAM device of claim 29, further comprising:

a plurality of additional storage elements, the storage element and each of the plurality of additional storage elements to store the portion of the translation information for one cycle of the plurality of cycles; and selection circuitry coupled to the storage element and the plurality of additional storage elements to select from among the storage element and the plurality of additional storage elements based on a particular cycle of the plurality of cycles for transmission to the decode circuitry.

31. An apparatus comprising:

a content addressable memory (CAM) array;

means for translating, in response to translation information, a bit group from a position of an input data having a plurality of bit groups to a different position in a comparand; and means for programming the translation information using programming information that includes a bit pattern in which each bit corresponds to a respective bit group of the plurality of bit groups.

32. The apparatus of claim 31, wherein the means for programming comprises:

means for storing the programming information; and means for converting the programming information into the translation information.

33. The apparatus of claim 32, wherein the translating comprises means for selecting the translation information from a plurality of translation information.

34. A method, comprising:

converting a binary pattern into translation information for a content addressable memory (CAM) array; and translating input data, having one or more bit groups, in the CAM array using the translation information, wherein a bit in the binary pattern represents a particular bit group of the input data.

35. The method of claim 34, further comprising programming a storage element in the CAM array with the binary pattern.

36. The method of claim 35, wherein translating comprises translating, in response to the translation information, a first bit group from a first position in the input data to a different position in a comparand.

* * * * *